(12) United States Patent
Hildebrand et al.

(10) Patent No.: US 11,504,805 B2
(45) Date of Patent: Nov. 22, 2022

(54) METHOD FOR MACHINING A WORKPIECE SURFACE BY MEANS OF A LASER

(71) Applicant: SAUER GmbH, Stipshausen (DE)

(72) Inventors: Peter Hildebrand, Pfronten (DE);
Gottfried Reinicke, Kempten (DE)

(73) Assignee: SAUER GmbH, Stipshausen (DE)

( * ) Notice: Subject to any disclaimer, the term of this patent is extended or adjusted under 35 U.S.C. 154(b) by 662 days.

(21) Appl. No.: 16/485,642

(22) PCT Filed: Feb. 2, 2018

(86) PCT No.: PCT/EP2018/052660
§ 371 (c)(1),
(2) Date: Aug. 13, 2019

(87) PCT Pub. No.: WO2018/146018
PCT Pub. Date: Aug. 16, 2018

(65) Prior Publication Data
US 2019/0358744 A1    Nov. 28, 2019

(30) Foreign Application Priority Data

Feb. 13, 2017 (DE) .................. 10 2017 202 269.8

(51) Int. Cl.
*B23K 26/082* (2014.01)
*B23K 26/352* (2014.01)
(Continued)

(52) U.S. Cl.
CPC .......... *B23K 26/082* (2015.10); *B23K 26/355* (2018.08); *B23K 26/359* (2015.10);
(Continued)

(58) Field of Classification Search
CPC .. B23K 26/082; B23K 26/355; B23K 26/359; B41M 5/24; B41M 5/26; G05B 19/19; G05B 2219/45164; G05B 2219/50212
See application file for complete search history.

(56) References Cited

U.S. PATENT DOCUMENTS

2008/0302771 A1    12/2008  Zhang et al.
2014/0021177 A1 *  1/2014  Koch ................ B23K 26/04
                                              219/121.69
(Continued)

FOREIGN PATENT DOCUMENTS

DE    10 2013 017 878 A1    4/2015
DE    10 2014 210 611 A1    12/2015
(Continued)

OTHER PUBLICATIONS

Translation of chinese first action (Year: 2019).*
(Continued)

*Primary Examiner* — Tracie Y Green
(74) *Attorney, Agent, or Firm* — Oliff PLC

(57) ABSTRACT

A method for machining at least one workpiece surface to apply a texture pattern to at least one section of the workpiece surface using a laser, based on image data specifying an image of the texture pattern applied to the at least one section of the workpiece surface and model data specifying a three-dimensional geometry of a surface form corresponding to the at least one section of the workpiece surface. Control data and segment data are generated based on the image and model data. The control data specify one or more segment sequences for each track line. Each segment sequence has track segments where the laser guides the texture pattern application to the at least one section of the workpiece surface; wherein the track segments of a segment sequence include one or more laser track segments where (Continued)

the laser travels in the switched-on state at a constant machining setpoint speed.

32 Claims, 8 Drawing Sheets

(51) Int. Cl.
    *B23K 26/359* (2014.01)
    *G05B 19/19* (2006.01)
    *B41M 5/24* (2006.01)
    *B41M 5/26* (2006.01)

(52) U.S. Cl.
    CPC ............... *B41M 5/24* (2013.01); *B41M 5/26* (2013.01); *G05B 19/19* (2013.01); *G05B 2219/45164* (2013.01); *G05B 2219/50212* (2013.01)

(56) References Cited

U.S. PATENT DOCUMENTS

| | | | |
|---|---|---|---|
| 2014/0175067 A1* | 6/2014 | Reichenbach | B23K 26/361 219/121.61 |
| 2016/0128874 A1 | 5/2016 | Schneider et al. | |
| 2016/0207141 A1* | 7/2016 | Conseil | B23K 26/082 |
| 2017/0080734 A1 | 3/2017 | Wadehn et al. | |
| 2018/0207748 A1* | 7/2018 | Oehler | B23K 26/359 |

FOREIGN PATENT DOCUMENTS

| | | |
|---|---|---|
| JP | H10-258373 A | 9/1998 |
| JP | 2009-142866 A | 7/2009 |
| JP | 2012-6039 A | 1/2012 |
| JP | 2015-166178 A | 9/2015 |
| WO | 2016/189344 A1 | 12/2016 |

OTHER PUBLICATIONS

Aug. 4, 2021 Office Action cited in Chinese Patent Application No. 201880011772.1.
Nov. 26, 2021 Office Action issued in Korean Application No. 10-2019-7026665.
Sep. 16, 2020 Office Action issued in Japanese Patent Application No. 2019-543269.
Oct. 29, 2020 Office Action issued in European Patent Application No. 18 703 009.3.
Dec. 31, 2020 Office Action issued in Chinese Patent Application No. 201880011772.1.
Mar. 24, 2021 Office Action issued in Korean Patent Application No. 10-2019-7026665.
Aug. 3, 2018 Search Report issued in International Patent Application No. PCT/EP2018/052660.
Aug. 13, 2019 International Preliminary Report on Patentability issued in International Patent Application No. PCT/EP2018/052660.

* cited by examiner

METHOD FOR MACHINING A WORKPIECE SURFACE BY MEANS OF A LASER

The present invention relates to a method for machining a workpiece by way of a laser, in particular to a method for machining at least one workpiece surface in order to apply a texture pattern to at least one section of the workpiece surface by way of a laser, in particular on a numerically controlled machine tool.

The present invention additionally relates to a method for generating track segment data for use in the generation of control data for a method for machining at least one workpiece surface in order to apply a texture pattern to at least one section of the workpiece surface by way of a laser, in particular on a numerically controlled machine tool.

BACKGROUND OF THE INVENTION

Machining materials in the micrometer range encompasses the most extremely wide variety of tasks, such as for example drilling, etching, structuring or cutting. Extreme accuracy and speed requirements are in this case often imposed on the machining processes. Laser scanning processes (including laser machining, for example laser texturing) are prevalent over other machining methods in this range. They have considerably higher dynamics and precision in comparison with conventional machining processes such as milling and grinding. Complicated patterns and structures (for example textures) are also able to be generated in a workpiece to a considerably better quality and at a considerably higher speed using such a laser scanning system. The range of materials able to be machined in this case ranges from plastics and all types of metals to glass and ceramic.

One output method that is used, on the basis of which it is possible to generate delicate structures and patterns (for example a flat pattern or a texture) on a workpiece by way of a laser device or a laser scanning system, is what is known as the skywriting method. The laser machining is in this case controlled on the basis of control data that guide the laser along a track on the workpiece surface on the basis of a multiplicity of individual segment sequences of the control data.

In this context, each segment sequence of the control data receives a segment or track segment in which the laser is switched on and over which the laser travels at a substantially constant machining speed in the switched-on state (hereinafter called machining segment or laser track segment), a starting segment (starting traveled-over segment), in which the laser is accelerated upstream of the machining segment or laser track segment, and a braking segment (end traveled-over segment), in which the laser is braked again after the machining segment, the laser being switched off during the acceleration and the braking.

This sequence of the various segments is used to guide the laser over the workpiece precisely and at a constant setpoint speed during the actual machining.

This may however bring about the disadvantage, in the case of very short machining segments that additionally lie close to one another, that the braking segment overlaps another starting segment. As a result thereof, it may be the case that the laser is moved back again after traveling through the braking segment so as then to be able to once more begin with the acceleration of the laser (starting segment). The resultant "pilgrim step" (in this respect see FIG. 1, top illustration) of the laser leads to a huge increase in the machining time.

Based on the above explanations and the skywriting method, one object of the present invention is to provide a method for machining a workpiece in order to apply a pattern by way of a laser, by way of which the machining time is able to be considerably reduced and at the same time the quality of the generated pattern is able to be maintained.

SUMMARY OF THE INVENTION

According to the present invention, a method as claimed in claim 1 and an additional method as claimed in claim 24 are proposed in order to achieve the above object. A control device for use on a numerically controlled machine tool as claimed in claim 25 and a machine tool as claimed in claim 26 are additionally proposed. The dependent claims relate to advantageous exemplary embodiments.

According to one aspect of the present invention, what is proposed is a method for machining at least one workpiece surface in order to apply a texture pattern to at least one section of the workpiece surface by way of a laser, in particular on a numerically controlled machine tool.

The method comprises providing image data that specify an image of the texture pattern to be applied to the at least one section of the workpiece surface, and model data that specify a three-dimensional geometry of a surface form corresponding to the at least one section of the workpiece surface; and/or generating track segment data on the basis of the image data and of the model data, wherein the track segment data each specify a multiplicity of consecutive laser track segments along the respective track line for a multiplicity of track lines running on the section of the workpiece surface, depending on the texture pattern.

The method furthermore comprises generating control data on the basis of the generated track segment data, wherein the control data specify one or more segment sequences for each track line and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed; and/or outputting the generated control data to a laser device that controls the laser in order to apply the texture pattern to the at least one section of the workpiece surface on the basis of the control data.

The track segment data may preferably, in particular advantageously, be created on the basis of the image data and model data, provided that, preferably for each track line, the number of adjacent laser track segments that are arranged so as to be substantially collinear relative to one another is preferably increased, and is in particular preferably maximized.

The control data are then advantageously generated such that each segment sequence, having at least two laser track segments, between two adjacent laser track segments that are preferably aligned substantially collinear to one another, each has a traveled-over segment over which the laser travels in the switched-off state at the substantially constant machining setpoint speed.

The present invention is based on the concept that the track segment data are provided such that, in the context of very small angle deviation tolerances (preferably less than 3°, in particular preferably less than 1.5°), the consecutive laser track segments on a track line are arranged so as to be as collinear as possible such that as many of the laser track segments as possible (up to more than 80%) of a track line are integrated in a segment sequence such that as far as possible no acceleration or braking segments have to be inserted between adjacent laser track segments in order to start a new segment sequence, but instead the regions lying between the laser track segments are advantageously able to be traveled over without interruption in the context of the same segment sequence without having to brake the machining setpoint speed.

This has the great advantage that the overall machining time is able to be significantly reduced, since more effective segment sequences covering more laser track elements are able to be traveled through by way of the laser without interruption and realignment, and also higher surface qualities are able to be achieved since it is possible to travel at more uniform machining speeds.

One aspect of the invention that advantageously makes it possible to generate the control data such that more laser track segments are able to be integrated into a common segment sequence to be traveled through in one piece is that the generation of the laser track segments is started even before the actual segment sequences for generating the control data are created or selected. This is advantageously made possible in that it is already able to be checked when compiling the laser track segments, on the basis of the image and model data, for each track line, to what extent laser track segments that are as collinear as possible are already able to be arranged consecutively or are arranged consecutively.

The inventors have additionally discovered that numerical preparation of the data and coordinates, for example by way of smoothing, approximation, unusual increases in accuracy, as early as in the determination of the laser track segments, and also through additional smoothing and modification of the coordinates of the determined laser track segments prior to the generation of the control data containing the segment sequences, have an unexpectedly great effect that optimized control data are able to be generated that comprise segment sequences containing a plurality of laser track segments able to be traveled over together, such that the machining time is able to be significantly reduced. This relates in particular to surface forms having deviations from the purely flat surface, for example in the application of texture patterns to workpieces having freeform surfaces.

According to one particularly expedient configuration, the step of generating track segment data for each track line may furthermore comprise the step of increasing the collinearity of adjacent laser track segments of the corresponding track line, in particular preferably by modifying the three-dimensional coordinates of the laser track segments, for example in a substantially radial direction relative to the direction of the laser track segments or the respective track line. "Radial direction" is understood in this case to mean a direction that extends, at the respective coordinate point, substantially radially (that is to say substantially perpendicularly) away from or toward the track line, the corresponding laser track segment or an interpolating straight line running through the laser track segments. In the simplest case, this may be performed on the basis of a projection onto a substantially straight line (for example an interpolating straight line running through several or all of the laser track segments of a track line).

This has the advantage that, even after the laser track segments have been created/determined on the basis of the image and model data, the determined coordinates of the laser track segments are still additionally able to be modified, preferably in the lateral direction (that is to say transverse or perpendicular to the direction of the laser track segments) in order to yet further increase the collinearity of the laser track segments of a track line and to allow even further optimized segment sequences.

The modification of the three-dimensional coordinates of the laser track segments in a substantially radial direction is preferably performed by way of shifting coordinates of one or more points of the laser track segments in a substantially radial direction relative to the direction of the laser track segments or of the respective track line.

This has the advantage that, even after the laser track segments have been created/determined on the basis of the image and model data, the determined coordinates of the laser track segments are still additionally able to be modified, particularly efficiently in the lateral direction (that is to say transverse or perpendicular to the direction of the laser track segments) in order to yet further increase the collinearity of the laser track segments of a track line and to allow even further optimized segment sequences.

In the step of increasing the collinearity of adjacent laser track segments of a track line for three-dimensional coordinates of the laser track segments, a substantially radial coordinate shift is preferably performed up to a maximum coordinate shift limit value.

This has the advantage that the coordinate shifts are only able to be performed in the context of a tolerable limit value in order to obtain the required or desired image quality of the texture pattern to be applied.

A first coordinate axis in the three-dimensional coordinate system of the model data is preferably aligned substantially parallel to the laser direction of incidence during the machining, and a plane of the other two coordinate axes in the three-dimensional coordinate system of the model data is preferably aligned substantially perpendicular to the laser direction of incidence during the machining.

The coordinate shift limit value for a coordinate shift in the direction of the first coordinate axis is preferably greater than the coordinate shift limit value for a coordinate shift in a direction lying in the plane of the other two coordinate axes.

This has the advantage that the coordinate modification in the direction in a laser direction that does not significantly influence the image quality of the texture pattern may prove to be higher, in order to increase the collinearity of the laser track segments, than in a direction that lies perpendicular to the laser direction of incidence.

A distance between adjacent track lines is preferably substantially less than or equal to a width of the laser on the workpiece surface during machining thereof, and in particular greater than or equal to half the width of the laser on the workpiece surface during machining thereof.

The coordinate shift limit value, in particular for a coordinate shift in a direction lying in the plane of the other two coordinate axes (substantially perpendicular to the laser direction of incidence), is preferably less than or equal to 5% of the width of the laser on the workpiece surface during machining thereof, in particular less than or equal to 1% of the width of the laser on the workpiece surface during machining thereof.

The coordinate shift limit value for a coordinate shift in the direction of the first coordinate axis is preferably greater than or equal to 10%, in particular greater than or equal to 35%, of the width of the laser on the workpiece surface during machining thereof; and/or the coordinate shift limit value for a coordinate shift in the direction of the first coordinate axis is greater than or equal to 50% of the tolerance width of the focal position of the laser, in particular greater than or equal to 75% of the tolerance width of the focal position of the laser.

The modification of the three-dimensional coordinates of the laser track segments is preferably performed in a substantially radial direction in a plane lying substantially perpendicular to the laser direction of incidence and/or the modification of the three-dimensional coordinates of the laser track segments is preferably performed in a substantially radial direction substantially parallel to the laser direction of incidence.

According to one particularly expedient configuration, the model data furthermore specify a coordinate mapping of two-dimensional coordinates of a first coordinate system of the image data onto three-dimensional coordinates of a second coordinate system on the surface form of the model data. As an alternative or in addition, the model data furthermore specify a coordinate mapping of two-dimensional coordinates of the first coordinate system of the image data onto two-dimensional coordinates of a third coordinate system of surface coordinates (for example UV coordinates) running on the surface form.

The model data may be specified on the surface by additional two-dimensional coordinates that describe the mapping of the two-dimensional coordinate space into the three-dimensional coordinate space. These may be for example UV coordinates.

The generation of track segment data on the basis of the image data and of the model data preferably comprises the steps of: hatching a section, corresponding to the at least one section of the workpiece surface, with a multiplicity of parallel-running track lines, projecting the track lines or segments of the track lines onto the three-dimensional geometry of the surface form corresponding to the at least one section of the workpiece surface, and/or determining track line segments at which the track lines overlap the texture pattern in the corresponding section of the image of the texture pattern.

This has the advantage that straight-running track lines are easily and efficiently able to be projected from the two-dimensional space of the image data into the space of the model data with three-dimensional coordinates, onto the surface form of the workpiece in accordance with the model data, in order to be able to precisely and reliably determine laser track segments on the three-dimensional workpiece, even at uneven points or on freeform surfaces.

The generation of track segment data on the basis of the image data and of the model data preferably in this case for example comprises the steps of: hatching a section, corresponding to the at least one section of the workpiece surface, of the image of the texture pattern with a multiplicity of parallel-running track lines; determining track line segments at which the track lines overlap the texture pattern in the corresponding section of the image of the texture pattern; and/or projecting the determined track line segments onto the three-dimensional geometry of the surface form corresponding to the at least one section of the workpiece surface by mapping two-dimensional coordinates of each track line segment from the first coordinate system of the image data onto three-dimensional coordinates on the surface form of the model data on the basis of the coordinate mapping of the model data such that the three-dimensional coordinates, for each track line segment in the first coordinate system, of a corresponding laser track segment are determined in the second coordinate system.

In some exemplary embodiments, it may for example be assumed that the parallel-running straight-line track lines are arranged in the 2D coordinate space of the image data of the pixel image of the texture pattern and are projected onto the surface form of the 3D model data as early as or alongside the determination of the overlaps with the texture pattern from the 2D coordinate space of the image data, or track line segments already determined in the 2D space of the image data corresponding to the texture pattern are projected.

In this case, for example, the multiplicity of parallel-running track lines may be arranged in the first coordinate system of the image data and the step of determining track line segments at which the track lines overlap the texture pattern in the corresponding section of the image of the texture pattern may be performed in the first coordinate system of the image data.

In the step of projecting the track lines or segments of the track lines, the determined track line segments may preferably be projected onto the three-dimensional geometry of the surface form corresponding to the at least one section of the workpiece surface, in particular for example by mapping two-dimensional coordinates of each determined track line segment from the first coordinate system of the image data onto three-dimensional coordinates on the surface form of the model data on the basis of the coordinate mapping of the model data, preferably such that the three-dimensional coordinates, for each track line segment in the first coordinate system, of a corresponding laser track segment are determined in the second coordinate system.

It is also possible, in other expedient exemplary embodiments, to arrange the parallel-running straight-line track lines in the 3D coordinate space of the image data in the predetermined plane, which may be for example that plane that is aligned substantially perpendicular to the laser direction of incidence (for example the X-Y plane in FIG. 8). All of the track lines may then be projected onto the surface form of the 3D model data in one direction (for example perpendicular to the plane). Furthermore, two-dimensional surface coordinates (for example UV coordinates) may then be read for each projected track line on the surface form of the 3D model data, for which surface coordinates pixel values or interpolated pixel values may then be read from the image data or the pixel image. On the basis of the read pixel values or interpolated pixel values, the corresponding laser track segments or laser track segment coordinates may then be read on the projected track line.

In this case, the multiplicity of parallel-running track lines in the second coordinate system of the model data may be arranged in a track line plane that is aligned in particular substantially perpendicular to the laser direction of incidence.

In the step of projecting the track lines or segments of the track lines, the track lines in the second coordinate system of the model data may then be projected from the track line plane onto the three-dimensional geometry of the surface form corresponding to the at least one section of the workpiece surface, in particular substantially in the projection direction perpendicular to the track line plane.

In the step of determining track line segments at which the track lines overlap the texture pattern in the corresponding section of the image of the texture pattern, it is then possible, by way of the coordinate mapping for coordinates of the projected track line, to determine image values, in particular pixel values, of the image data, specifying the texture pattern, at corresponding coordinates in the coordinate space of the image data, and the track line segments may preferably be determined on the basis of the determined image values (for example pixel values, preferably after sub-pixel interpolation) in the coordinate space of the model data.

The image data preferably specify a pixel image (raster graphics) of the texture pattern with a pixel width that is greater than or equal to 10% of the width of the laser on the workpiece surface during machining thereof, in particular is greater than or equal to 25% of the width of the laser on the workpiece surface during machining thereof.

This has the advantage that the amount of data (for example file size) for the image data is able to be kept within limits and excessively resolved amounts of data do not arise for large surfaces.

A sub-pixel interpolation is preferably performed during the determination of track line segments at which the track lines overlap the texture pattern in the corresponding section of the pixel image of the texture pattern, or during the determination of image values or pixel values.

This has the advantage that, despite an efficient amount of data (for example relatively small file size) for the image data, pixel rounding errors in the lateral direction are able to be avoided in the projection of the track lines into the space of the model data.

It is pointed out here that such a sub-pixel interpolation in order to determine the coordinates of the track lines in the pixel image extremely unexpectedly offers advantages. Pixel sizes are generally roughly the same or even somewhat smaller than the width of the laser in the machining, such that, in order to guarantee the image quality of the applied texture pattern, such a sub-pixel interpolation is neither necessary nor advantageous.

The inventors have however discovered that the possible pixel rounding errors without sub-pixel interpolation, although they do not entail any notable spatial resolution problems, may however lead to the occurrence of extremely short laser track segment sections that are barely visible and that also do not have any noteworthy size (a length of such sections is shorter than the pixel width), but may lead to considerable angle deviations on the laser track segment, such that problems may unexpectedly occur if the sections are not able to be traveled in a segment sequence, such that the machining time is unnecessarily and disadvantageously extended for reasons that are not readily obvious.

This may be improved by sub-pixel interpolation, in particular preferably in the lateral direction transverse relative to the track lines, without having to provide an even more resolved image file with larger amounts of data. The machining time is thus able to be further reduced by further optimizing the track segment data generation.

A coordinate interpolation in a lateral direction lying transverse or perpendicular relative to the direction of the corresponding track line is preferably performed in the sub-pixel interpolation.

The three-dimensional geometry specified in the model data preferably has a multiplicity of polygonal surfaces, and in particular a projection, performed in the generation of track segment data, of a straight track line onto the three-dimensional geometry specified in the model data, due to one or more transitions between adjacent polygonal surfaces that are inclined to one another, leads to mapping of the straight track line onto a track line having corners.

This may be for example a geometry having triangular polygonal surfaces and/or n-sided polygonal surfaces, where n>3. Additional two-dimensional coordinates that describe the mapping of the two-dimensional coordinate space into the three-dimensional coordinate space may also already be provided on the surface in this case. These may be for example UV coordinates.

Numerical smoothing is preferably performed for a track line determined by way of projecting a straight track line onto the three-dimensional geometry specified in the model data in the generation of track segment data. Coordinates of laser track segments lying on the corresponding track line are preferably determined on the basis of the numerically smoothed track line.

This has the advantage that any corners in track lines or track line segments or laser track segments that may occur due to the polygonal surface transitions are able to be numerically smoothed, as a result of which the collinearity of the determined laser track segments is able to be increased even further in the generation of the track segment data.

The numerical smoothing preferably has a first smoothing procedure, performed in the three-dimensional space, in which corners of the corresponding track line are smoothed, preferably such that the smoothed track line has rounded profiles at positions of the corners that were previously present.

This has the advantage that any corners in track lines or track line segments or laser track segments that may occur due to the polygonal surface transitions are able to be numerically smoothed, as a result of which the collinearity of the determined laser track segments is able to be increased even further in the generation of the track segment data.

The numerical smoothing preferably has a second smoothing procedure, performed in the laser direction of incidence, in which the track line smoothed by way of the first smoothing procedure is smoothed in the direction of the direction aligned parallel to the laser direction of incidence, preferably such that the further-smoothed track line runs flatter relative to the unsmoothed track line on a plane aligned perpendicular to the laser direction of incidence.

This has the advantage that any corners in track lines or track line segments or laser track segments that may occur due to the polygonal surface transitions are able to be numerically smoothed even further, as a result of which the collinearity of the determined laser track segments is able to be increased even further in the generation of the track segment data. It is taken into account here that the location accuracy in the laser direction of incidence is significantly reduced (in favor of the considerably reducible machining time) and the location deviation deviates from the actual surface position. However, this is able to be tolerated without relatively great disadvantageous effects, since the positions remain exactly positioned perpendicular to the laser direction of incidence and any shifts in the laser direction of incidence barely influence the achievable image quality.

In the distance direction (laser direction of incidence), however, the laser process, due to the beam caustics and Rayleigh length, tolerates considerably higher deviations (depending on the focal length and beam quality, up to a few tenths of mm) than it does laterally thereto. As a result, it is possible to smooth the coordinates in this direction, or to distort them through smoothing, to a considerably greater extent than would be possible laterally. The excessive smoothing leads to small deviations in the focal position with respect to the surface, which becomes invisible within the context of a tolerance, but removes a great deal of roughness from the sequence. Viewed in three dimensions, the curve thus appears substantially collinear and the output, in terms of the number, is able to generate longer segment sequences with a greater time saving.

The image data preferably specify a pixel image of the texture pattern, each pixel of the pixel image preferably being assigned a pixel value that preferably specifies a predetermined depth of the texture pattern to be applied to the tool surface at the corresponding position of the texture pattern.

This has the advantage that the pixel image is able to be used easily and efficiently for a plurality of machining steps in order to carve to different depths, without individual image data having to be provided for each depth layer.

Individual track segment data are preferably generated for different depth levels of the texture pattern on the basis of the pixel values of the pixel image, preferably such that the texture pattern is carved out to different depth levels in consecutive machining procedures on the basis of the control data generated on the basis of the respective track segment data.

According to one particularly expedient configuration, in numerical calculations of the method, in the generation of the track segment data, the coordinates of the image and/or model data, in particular including the two-dimensional and/or three-dimensional coordinates underlying the coordinate mapping, are read with a spatial resolution that preferably has at least a resolution accuracy of $1/1000$ of the width of the laser on the workpiece surface, of the distance between adjacent track lines, of a polygon size of the model data, or of a pixel width of the image data, in particular preferably an accuracy of at least $1/10000$ of one of the above variables. According to one particularly expedient configuration, in numerical calculations of the method, in the generation of the track segment data, the coordinates of the image and/or model data, in particular including the two-dimensional and/or three-dimensional coordinates underlying the coordinate mapping, are read with a spatial resolution that preferably has at least a resolution accuracy of 10 nm, in particular substantially a resolution accuracy of 1 nm.

This has the advantage, although the accuracies in relation to the desired image resolution and the width of the laser in the machining are selected so as to be unexpectedly and unusually accurate, that rounding errors in the numerical calculations are able to be avoided, which calculations would not play a role in the image spatial resolution, but may, in relation to directional deviations of small laser track segments, cause surprisingly large angle deviations or collinearity deviations. The collinearity of the laser track segments is thus able to be increased in a particularly surprising manner, and the machining time is able to be significantly reduced, since even more laser track segments are able to be integrated into common segment sequences.

According to one particularly expedient configuration, each segment sequence comprises a starting traveled-over segment (starting segment) over which the laser travels in the switched-off state so as to accelerate to the machining setpoint speed, and an end traveled-over segment (braking segment) over which the laser travels in the switched-off state so as to brake from the machining setpoint speed. When collinearity is present, the segment sequences comprise a plurality of consecutive laser track segments, each of which are separated by traveled-over segments that are able to be traveled through "without interruption" at substantially constant speed when the laser is switched off. This allows the significant reduction in the machining time.

According to a further aspect of the invention, what is proposed is a method for generating track segment data for use in the generation of control data for a method for machining at least one workpiece surface in order to apply a texture pattern to at least one section of the workpiece surface by way of a laser, in particular on a numerically controlled machine tool, in accordance with one of the above aspects.

The control data preferably specify one or more segment sequences for each track line, and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed.

The method preferably comprises: providing image data that specify an image of the texture pattern to be applied to the at least one section of the workpiece surface, and model data that specify a three-dimensional geometry of a surface form corresponding to the at least one section of the workpiece surface; and generating track segment data on the basis of the image data and of the model data, wherein the track segment data each specify a multiplicity of consecutive laser track segments along the respective track line for a multiplicity of track lines running on the section of the workpiece surface, depending on the texture pattern.

The track segment data are preferably created on the basis of the image data and model data, provided that, for each track line, the number of adjacent laser track segments that are arranged so as to be substantially collinear relative to one another is increased, and is in particular maximized, preferably such that, in the generation of the control data, the number of the adjacent laser track segments of a track line that are aligned substantially collinear to one another and are able to be integrated into a common segment sequence is increased, and is in particular maximized.

In summary, aspects and preferred configurations are proposed in order to provide methods for machining a workpiece in order to apply a pattern by way of a laser, by way of which methods the machining time during the machining of the workpiece and in particular the application of the pattern is able to be considerably reduced and at the same time the quality of the generated pattern is able to be maintained.

In order to be able to take advantage of these proposed methods as best possible, it is particularly advantageous if a laser device for use on a machine tool, or a machine tool having such a laser device, is used for machining a workpiece in accordance with the method aspects described above, having a laser with a very high pulse frequency. This has the advantage that the higher achievable machining speeds when traveling over the on average longer machining segments (in particular "without a pilgrim step") are able to be used without negatively influencing the line quality of the laser track segments traveled over by the switched-on laser due to an excessively slow maximum achievable pulse frequency.

To this end, pulse frequencies in the range of 100 kHz up to 1 MHz may preferably be applied, such that the speed advantage of the higher machining setpoint speeds is also actually able to be transferred to a greater extent to the workpiece surface due to the machining segments (laser track segments) arranged so as to be collinear and the thereby optimized (each longer on average) segment sequences, each of which are able to be traveled over at a higher machining setpoint speed over many laser track segments "without a pilgrim step". This allows an even further or more considerably reduced machining time.

By way of example, a laser pulse overlap of greater than or equal to 50% is preferably achieved, preferably greater than or equal to 75%, in order to guarantee a high machining quality. To this end, for example in the case of a predefined diameter (width) of the laser during the machining on the workpiece surface, the pulse frequency and the maximum machining speed (that is to say the maximum speed at which the laser travels over laser track segments or interspersed traveled-over segments) are preferably selected such that a ratio of the maximum machining speed to the laser pulse frequency is selected that is less than or equal to half the diameter (width) of the laser, in order for example to achieve at least a laser pulse overlap of greater than or equal to 50%, or that is less than or equal to ¾ the diameter (width) of the laser, in order for example to achieve at least a laser pulse overlap of greater than or equal to 75%. If the pulse frequency is in this case increased, the maximum machining speed may thereby be increased at the same time, since the ratio is decisive.

A further, particularly advantageous configuration of a machine tool that possibly preferably already has a laser with a very high pulse frequency consists of expanding the laser device, comprising the laser, of this machine tool with an additional divergence-changing device. Such a divergence-changing device is known for example from DE 10 2012 111 098 B4.

A laser scanner system normally has axes that need to be set very quickly (in the range of 5 m/s to 10 m/s or even more) in the X,Y plane (that is to say in the plane substantially perpendicular to the laser direction of incidence or laser beam direction), such that flat surfaces are able to be machined very quickly by the laser scanning system substantially perpendicular to the laser direction of incidence by way of fast laser setting speeds.

However, instead of a flat surface, a freeform surface in the 3D space is now to be machined, and so the system again has to be controlled at slower speeds, since, for the setting in the Z-direction (that is to say substantially in the direction of the laser direction of incidence), only one mechanically driveable axis is normally available, such that high machining speeds are not able to be achieved in an optimum manner in the 3D space. At this point, it is then possible to resort to the advantageous properties of a divergence-changing device that allows significantly higher setting speeds in the Z-direction, such that, in the 3D space containing all three linear translational degrees of freedom X, Y and Z as well, it is possible to achieve considerably higher machining speeds, in particular along track lines that lie in the 3D space on freeform surfaces.

The divergence-changing device may for example set the divergence angle of a laser beam so as to be variable such that the focal point of the laser beam is able to be focused on the workpiece to be machined with a quickly changeable focal length. Since, due to the structure of the workpiece surface, there may be different distances between a laser source and the workpiece, it may be necessary to focus the laser beam in a very short time in order to achieve an efficient and precise energy transfer from the laser beam to the workpiece.

The divergence-changing device, whose optically active elements are preferably arranged telecentrically, may in this case have a reflection system (for example a parabolic reflector) or a telecentric diffraction system (for example a lens system). A beam deflection device (for example a rotating mirror) deflects the laser beam within the divergence-changing device onto the correspondingly optically active elements, and is thus able to influence the course of the laser beam and its bundling/focusing.

By virtue of the advantageous development of a machine tool by way of a laser with a very high pulse frequency and the divergence-changing device, it is possible to transfer the speed advantage due to the machining segments arranged so as to be as collinear as possible to workpiece surfaces (for example with 3D freeform surfaces) in the three-dimensional space as well, such that the machining of workpiece surfaces are able to be optimized even further and an even more considerably reduced machining time is thereby able to be achieved. This is particularly expedient if this is combined with a laser that allows relatively high pulse frequencies, in particular preferably greater than or equal to 100 kHz, particularly preferably greater than or equal to 400 kHz, or even more optimally at greater than or equal to 800 kHz to up to more than 1 MHz.

Furthermore, what is proposed is a control device for use on a numerically controlled machine tool that comprises a laser device for machining at least one workpiece surface in order to apply a texture pattern to at least one section of the workpiece surface by way of a laser of the laser device.

The control device is preferably configured so as to perform a method as claimed in one of the preceding claims on the machine tool.

The control device is preferably configured so as to control the machine tool on the basis of the control data generated in a method as claimed in one of the preceding claims, which control data specify one or more segment sequences for each track line, and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed.

The control device is preferably configured, on the basis of provided model data that specify a three-dimensional geometry of a surface form corresponding to the at least one section of the workpiece surface, and provided image data that specify an image of the texture pattern to be applied to the at least one section of the workpiece surface, so as to generate laser track segment data, wherein the track segment data each specify a multiplicity of consecutive laser track segments along the respective track line for a multiplicity of track lines running on the section of the workpiece surface, depending on the texture pattern, wherein the track segment data are created on the basis of the image data and model data, provided that, for each track line, the number of adjacent laser track segments that are arranged so as to be substantially collinear relative to one another is increased, and is in particular maximized.

The control device is preferably configured so as to generate the control data on the basis of generated or provided laser track segment data.

The control data are preferably generated such that each segment sequence, having at least two laser track segments, between two adjacent laser track segments that are aligned substantially collinear to one another, each has a traveled-over segment over which the laser travels in the switched-off state at the substantially constant machining setpoint speed.

What is furthermore proposed is a machine tool having a control device described above; and/or a laser device having a laser that is able to be guided over a workpiece surface in a controlled manner in three directions by a control device of the machine tool (for example by the control device described above), in particular in order to apply a texture pattern to at least one section of the workpiece surface by way of the laser of the laser device.

The laser is preferably able to be moved in a direction substantially perpendicular relative to the direction of the laser beam of the laser at machining speeds of greater than or equal to 2 m/s, in particular greater than or equal to 4 m/s, in particular preferably greater than or equal to 10 m/s.

The laser device preferably has a divergence-changing device in order to control the laser in a direction aligned substantially in the direction of the laser beam of the laser.

The laser is preferably able to be moved in a direction of the laser beam of the laser at machining speeds of greater than or equal to 4 m/s, in particular preferably greater than or equal to 10 m/s.

The laser is preferably able to be moved in the direction of the laser beam of the laser at a maximum machining speed that is substantially equal to or greater than a maximum machining speed of the laser in a direction substantially perpendicular relative to the direction of the laser beam of the laser.

The laser of the laser device is preferably configured so as to be operated at a pulse frequency of greater than or equal to 200 kHz, in particular greater than or equal to 400 kHz and in particular preferably greater than or equal to 800 kHz.

What is furthermore proposed is a computer device or a computer program product containing a computer program that has instructions that, when executed on a computer, configures the computer so as to execute a method containing steps of the above aspects, in particular of generating the track segment data and/or of generating the control data.

Further aspects and advantages thereof, as well as advantages and specific configuration possibilities for the aspects and features described above, are described in the following descriptions and explanations, which should however be understood to be in no way limiting, with respect to the appended figures.

DETAILED DESCRIPTION OF THE FIGURES AND PREFERRED EXEMPLARY EMBODIMENTS OF THE PRESENT INVENTION

Examples or exemplary embodiments of the present invention are described in detail below with reference to the appended figures. It is emphasized that the present invention is however in no way limited or restricted to the exemplary embodiments described below and the embodiment features thereof, but rather also comprises modifications of the exemplary embodiments, in particular those that are comprised by modifying the features of the described examples within the context of the scope of protection of the independent claims. It is furthermore pointed out that all reference signs cited in the description of the respective figure are not present in every figure. In such cases, reference is made to the previous descriptions of the figures.

Figure 1A:
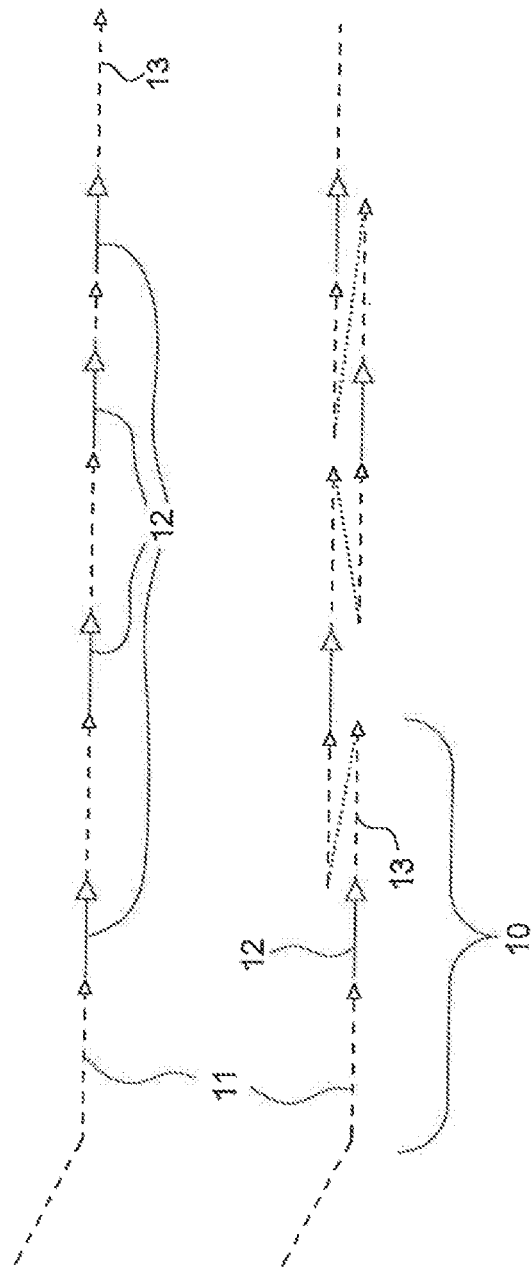
FIG. 1A schematically shows, by way of example, segments of a plurality of machining sequences with respective laser track segments for illustrating the problem of the "pilgrim step"

FIG. 1A shows, by way of example, machining sequences 10 having a plurality of machining segments 12, on the basis of which the laser (by way of example a pulsed laser, for example with achievable pulse frequencies of greater than or equal to 100 kHz, in particular with achievable pulse frequencies of greater than or equal to 500 kHz or greater than or equal to 1 MHz) is intended to machine the surface of the workpiece.

When applying the skywriting method and in the case of machining segments 12 (laser track segments) that lie excessively close to one another, the starting and braking segments 11 (starting traveled-over segment) and 13 (end traveled-over segment) overlap. Due to the skywriting method, the laser will then travel the braking segment 13 to the end, reset, and then begin again with the starting segment 11, as shown in the bottom section of FIG. 1A.

The resultant "pilgrim step" of the laser may lead to an extreme increase in the machining time in the case of very delicate textures with correspondingly short machining segments 12 that lie very close to one another.

To avoid this, track segment data are generated such that consecutive laser track segments 12 are specified so as to be substantially collinear, such that these are integrated into a common machining sequence 10 (segment sequence).

Figure 1B:
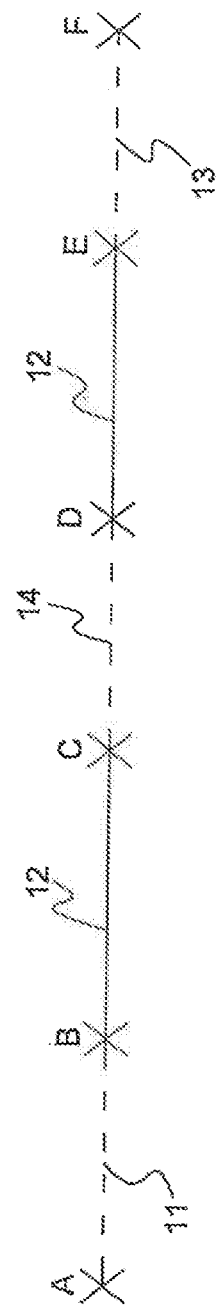
FIG. 1B shows, by way of example, a machining sequence with two adjacent collinear laser track segments.

FIG. 1B shows, by way of example, a machining sequence 10 with two adjacent collinear laser track segments 12 of a common track line. The laser track segments respectively have the starting coordinates of points B and D and the end coordinates of points C and E, which lie so as to be substantially collinear on a straight line. An angle deviation should in this case preferably be less than 3° and particularly preferably less than 1.5°.

A starting traveled-over segment 11 (starting segment), over which the laser travels in the switched-off state at an accelerating speed, is arranged between points A and B, such that the machining setpoint speed is reached at the latest at point B, and the laser is switched on at point B, such that the laser travels over the first laser track segment 12 at a substantially constant machining speed between point B and point C, and the laser is switched off at point C.

A traveled-over segment 14, over which the laser travels "without interruption" (that is to say substantially without braking or accelerating) at the substantially constant machining speed when the laser is switched off, is arranged between points C and D, and the laser is switched on at point D, such that the laser travels over the second laser track segment 12 at a substantially constant machining speed between point D and point E, and the laser is switched off at point E.

The laser may then brake again, when the laser is switched off, at the end traveled-over segment 13 (braking segment) between points E and F. Thus, unlike in the skywriting method in which in each case only one laser track segment in a segment sequence is machined, now two or more laser track segments 12 are able to be integrated into a common segment sequence and traveled over without interspersed braking and renewed acceleration, such that a significant reduction in machining time is made possible.

The aim in this case is to arrange the coordinates of the laser track segments so as to be as collinear as possible during the generation of the track segment data that specify these coordinates, or to increase the number of the substantially collinear laser track segments such that as many segment sequences as possible having a plurality of laser track segments or as many laser track segments as possible integrated into the segment sequence are provided before the control data that specify all of the segment sequences are generated on the basis of the track segment data.

First of all, by way of example, 2D image data, on the basis of raster graphics or a pixel image, and 3D model data are provided that contain specifications about the surface form of the workpiece to be machined, on the one hand, and the texture to be applied by the laser, on the other hand. The image data, especially the data in relation to the texture to be applied, may preferably be provided by a bitmap file or another type of raster graphics. The geometric information of the corresponding workpiece of the model data may be provided for example by way of an OBJ file or other 3D model data formats that are used in a later step.

After the provision of the image and model data, the image and model data may be numerically prepared and track segments or laser track segments may be determined on the basis of the texture of the image data and of the surface form of the model data, over which segments the laser has to travel in the switched-on state in order to apply the texture to be workpiece surface. The aim is to prepare the pixels, captured in the raster graphics, along which the laser would machine the surface of the workpiece, such that as many laser track segments as possible of a track line are arranged so as to be substantially collinear.

To this end, an extremely wide variety of numerical methods may be used. One example would be the mathematical smoothing of curved paths. In this case, a curve is intended to be converted into a curve with lower curvature, wherein, at the same time, there should be as little deviation as possible from the original. Specifically, lower-order approximation polynomials may prove to be extremely advantageous for this.

Another possibility is interpolating the raster graphics (for example through sub-pixel interpolation). In this case, individual pixels, in particular those that have a comparatively large deviation from the surrounding pixels arranged close to one another, may be "removed" from the raster graphics. Changes of direction that possibly occur later on in the generation of the connecting line between substantially collinear pixels are thereby able to be reduced. Following this, smoothing methods and the like may then be applied again to further optimize the raster graphics.

In the next step, the pixel image or the workpiece surface is divided into machining surface sections that are intended to be machined in order by the laser. The machining of the respective surface section is in this case dependent on the corresponding target geometry, which is formed from the geometric information about the workpiece and the texture to be applied.

Depending on the geometric nature of the workpiece, the resultant surface sections may be relatively large, having an edge length of several millimeters, or else be comparatively very small as well, having an edge length in the lower μm range.

In the following step, each of the machining surface sections is hatched out by defining a multiplicity of linear machining sequences 10, along which the laser is guided by a scanner system. Hatching out in this case means that a multiplicity of track lines running parallel to one another are laid over the section and projected onto the 3D surface in accordance with the model data, wherein overlaps with the texture pattern of the image data are additionally determined in order to determine the laser track segments lying on the laser track lines.

Each linear machining sequence later comprises a group of pixels of the raster graphics/of the pixel image and may be divided substantially into a start segment 11 (starting traveled-over segment) and an end segment 13 (end traveled-over segment) in which the laser is accelerated (start segment 11) or braked (end segment 13) in the switched-off state, and into one or more machining segments 12 (laser track segments) in which the laser is moved for example at constant speed in the switched-on state, wherein respective traveled-over segments 14 are arranged between machining segments/laser track segments 12 of a machining sequence (segment sequence).

Due to the pixels or laser track segments from the image data processing carried out beforehand or subsequent data modification, which pixels or laser track segments are present in substantially collinear form, these are particularly advantageously able to be mapped onto the linear machining sequences, such that a multiplicity of comparatively long machining sequences (segment sequences), some with a plurality of machining segments (laser track segments), are able to form.

On the basis of the determined laser track segments or the coordinates of these determined laser track segments that are output in track segment data, control data that specify all of the machining sequences (segment sequences) are generated.

In the next step, the control data specifying the machining sequences may then be output to the scanner system, on the basis of which control data the laser is guided over the workpiece surface.

Since each machining sequence has a start segment at the start and an end segment at the end, but travels without interruption over a plurality of laser track segments in between and interspersed traveled-over segments, the number of the acceleration and braking procedures of the laser may be considerably reduced overall in part for each machining surface section. This in turn leads to a considerable reduction in the machining time, which particularly has a considerable influence for large-surface applications, such as for example dashboards for the vehicle industry.

Figure 2A:
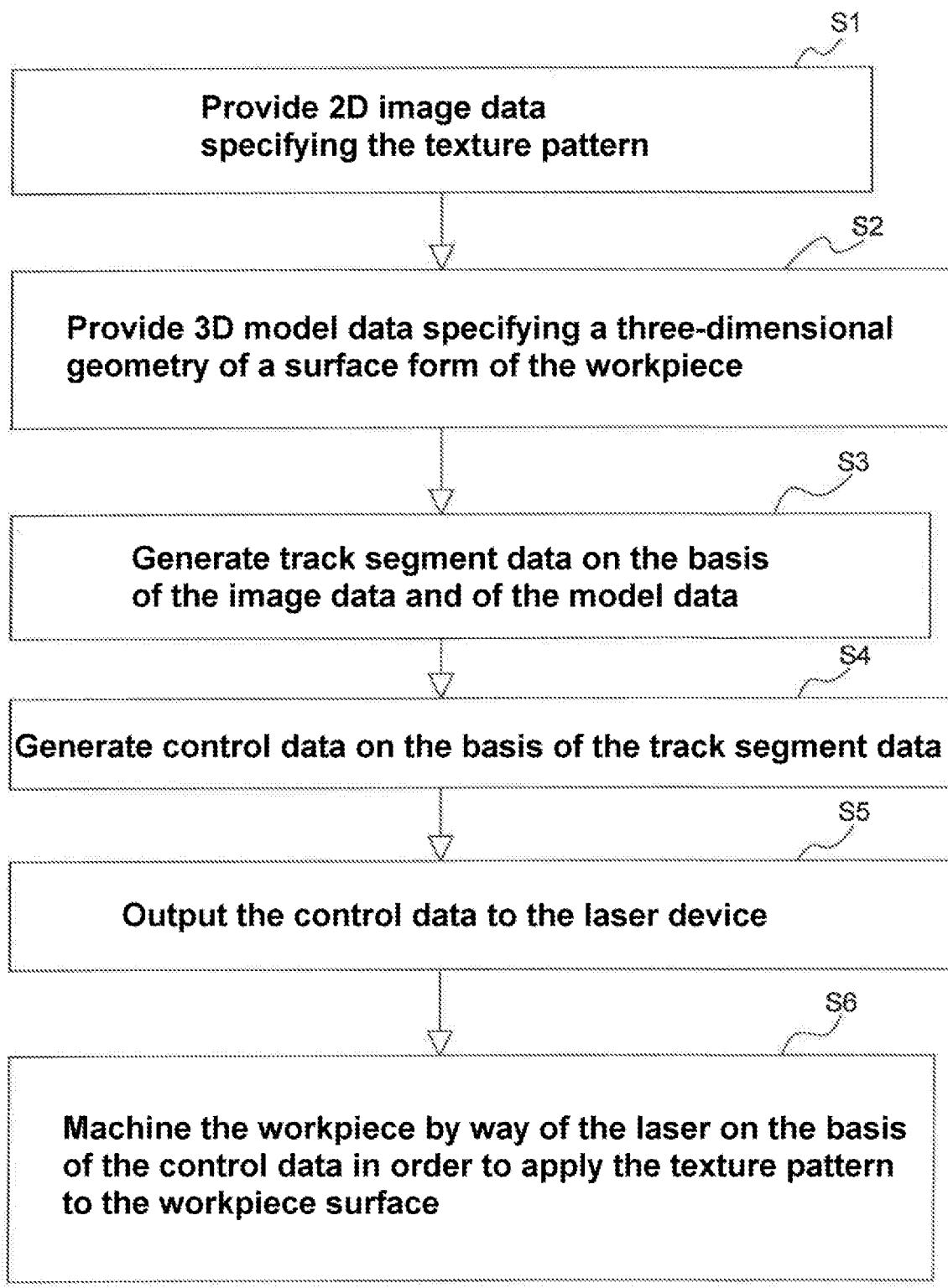
FIG. 2A shows, by way of example, a flowchart of one exemplary embodiment of the method according to the invention.
Figure 2B:
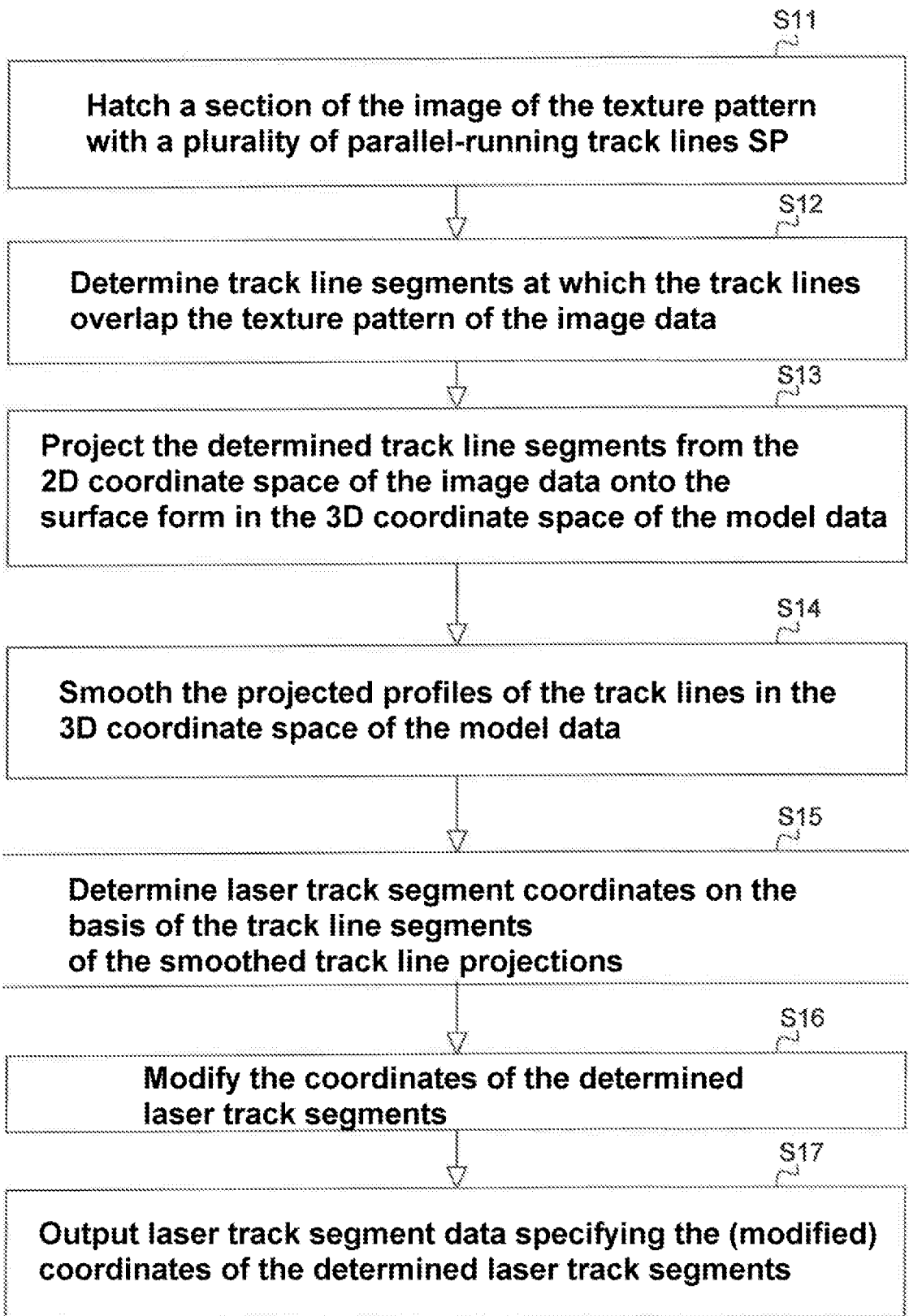
FIG. 2B shows, by way of example, the generation of track segment data according to one exemplary configuration.

FIG. 2A shows a flowchart of one exemplary embodiment of the method according to the invention, and FIG. 2B illustrates, by way of example, the generation of track segment data according to one exemplary configuration.

FIG. 2A illustrates, by way of example, a method for machining at least one workpiece surface in order to apply a texture pattern to at least one section of the workpiece surface by way of a laser, in particular on a numerically controlled machine tool.

In this case, a workpiece may already be machined on the basis of a setpoint geometry, as possibly specified in 3D model data, for example by milling, until the setpoint geometry has been carved out. A laser device or a laser scanner system may then be used on the machine tool in order to carve out a predetermined texture pattern on the workpiece service by way of a laser, for example by laser texturing.

The method comprises the steps S1 of providing image data that specify an image of the texture pattern to be applied to the at least one section of the workpiece surface, and S2 of providing model data that specify a three-dimensional geometry of a surface form corresponding to the at least one section of the workpiece surface.

In step S3, track segment data are generated on the basis of the image data and of the model data, wherein the track segment data each specify a multiplicity of consecutive laser track segments 12 along the respective track line SP for a multiplicity of track lines SP running on the section of the workpiece surface, depending on the texture pattern.

In step S4, control data are generated on the basis of the generated track segment data, wherein the control data specify one or more segment sequences 10 for each track line, and each segment sequence 10 has track segments along which the laser is guided in order to apply the texture pattern to the at least one section of the workpiece surface, and wherein the track segments of a segment sequence 10 comprise one or more laser track segments 12 over which the laser travels in the switched-on state at a substantially constant machining setpoint speed.

In step S5, the generated control data are output to the laser device or the control device thereof, which controls (S6) the laser on the basis of the control data in order to apply the texture pattern to the at least one section of the workpiece surface.

In particular, the track segment data are created in step S3 on the basis of the image data and model data, provided that, for each track line, the number of adjacent laser track segments that are arranged so as to be substantially collinear relative to one another is increased, and is in particular maximized.

Furthermore, the control data are in particular generated such that each segment sequence 10, having at least two laser track segments 12, between two adjacent laser track segments 12 that are aligned substantially collinear to one another, each has a traveled-over segment 14 over which the laser travels in the switched-off state at the substantially constant machining setpoint speed.

Furthermore, the control data are in particular generated such that each segment sequence 10 comprises a starting traveled-over segment 11 over which the laser travels in the switched-off state so as to accelerate to the machining setpoint speed, and an end traveled-over segment 13 over which the laser travels in the switched-off state so as to brake from the machining setpoint speed.

FIG. 2B illustrates, by way of example, a flowchart of one exemplary embodiment of a method for generating track segment data for use in the generation of control data for a method for machining at least one workpiece surface in order to apply a texture pattern to at least one section of the workpiece surface by way of a laser, in particular on a numerically controlled machine tool.

After providing the image and model data (S1, S2), the method according to FIG. 2B corresponds to an exemplary embodiment of step S3 in FIG. 2A.

It is assumed, by way of example, that the model data furthermore specify a coordinate mapping of two-dimensional coordinates of a first coordinate system of the image data onto three-dimensional coordinates of a second coordinate system on the surface form of the model data, wherein, by way of example, a first coordinate axis Z in the three-dimensional coordinate system of the model data is oriented substantially parallel to the laser direction of incidence during the machining and a plane of the other two coordinate axes X and Y in the three-dimensional coordinate system of the model data is aligned substantially perpendicular to the laser direction of incidence during the machining.

By way of example, it is furthermore assumed that the image data specify a pixel image of the texture pattern, wherein each pixel of the pixel image is assigned a pixel value that specifies a predetermined depth of the texture pattern to be applied to the workpiece surface at the corresponding position of the texture pattern, wherein individual track segment data are generated for different depth levels of the texture pattern on the basis of the pixel values of the pixel image such that the texture pattern is carved out to different depth levels in consecutive machining procedures on the basis of the control data generated on the basis of the respective track segment data.

By way of example, a plurality of track segment datasets are thus preferably determined for a section of the workpiece surface, wherein each track segment dataset is determined for a particular depth of the texture pattern and the laser later travels along consecutive depth levels that differ layer-by-layer on the basis of the respective corresponding track segment dataset.

In this case, the different depth levels may be traveled along in relation to the same workpiece surface sections, or else the arrangement of the sections that are in each case traveled along per se according to specific corresponding control data may be shifted for different depth levels such that different section borders result for different depth levels. Finally, the workpiece surface may be traveled along consecutively section by section and/or depth level by depth level. Overall however, by way of example, a respective individual set of associated track segment data is preferably generated in each case for a respective section and a respective depth level.

The method comprises, for one section (and preferably per depth level), a step S11 of hatching a section, corresponding to the at least one section of the workpiece surface, of the image of the texture pattern with a multiplicity of parallel-running track lines SP.

In this case, the track lines SP are preferably straight lines that are run parallel to one another on the corresponding section of the image of the texture pattern and are laid therein over the texture pattern specified by way of example in a pixel image (raster graphics).

The method furthermore comprises, by way of example, a step S12 of determining track line segments at which the track lines overlap the texture pattern in the corresponding section of the image of the texture pattern (or at which the track lines overlap a texture pattern region with a pixel value range corresponding to the instantaneous depth level in the corresponding section of the image of the texture pattern).

This makes it possible to determine laser track segments 12, in the plane of the image data above the texture pattern, that are able to be projected onto the surface of the workpiece into the 3D coordinate space.

For this purpose, by way of example, respective two-dimensional coordinates in the coordinate system of the image data are read on the basis of the pixel image of the texture pattern and the regions of the track lines at which the track lines overlap the texture pattern in the corresponding section of the image of the texture pattern (or at which the track lines overlap a texture pattern region with a pixel value range corresponding to the instantaneous depth level in the corresponding section of the image of the texture pattern).

An (optional) sub-pixel interpolation is preferably performed (see for example FIG. 4) in step S12 in the determination of coordinate values and/or pixel values for points of the track lines. Preferably, in the determination of track line segments at which the track lines overlap the texture pattern in the corresponding section of the pixel image of the texture pattern (or at which the track lines overlap a texture pattern region with a pixel value range corresponding to the instantaneous depth level in the corresponding section of the image of the texture pattern), a sub-pixel interpolation is performed in which a pixel value and/or coordinate interpolation is performed in a lateral direction lying transverse or perpendicular relative to the direction of the corresponding track line.

It is assumed, by way of example, that the image data specify a pixel image of the texture pattern with a pixel width that is greater than or equal to 10% of the width of the laser on the workpiece surface during machining thereof, in particular is greater than or equal to 25% of the width of the laser on the workpiece surface during machining thereof. By way of example, the values of the pixel width may lie in the range from 10 µm to 50 µm, particularly preferably at roughly 15 µm to 30 µm.

Such a sub-pixel interpolation makes it possible to avoid the disadvantages described in connection with FIG. 3 without having to provide a more accurate image resolution with undesirably high amounts of data, the required image quality firstly being achieved, but the collinearity of the laser track segments 12, determined later, of a track line additionally being able to be increased or guaranteed over large regions.

The method furthermore comprises, by way of example, a step S13 of projecting the determined track line segments onto the three-dimensional geometry of the surface form corresponding to the at least one section of the workpiece surface by mapping two-dimensional coordinates of each determined track line segment from the first 2D coordinate system of the image data onto three-dimensional coordinates on the surface form of the model data on the basis of the coordinate mapping of the model data, such that the three-dimensional coordinates, for each track line segment in the first coordinate system, of a corresponding laser track segment 12 are determined in the second coordinate system.

Such coordinate mapping may take place on the basis of additional coordinate mapping data that specify a mapping rule, or on the basis of two-dimensional surface coordinates, contained in the model data, on the surface form (for example UV coordinates on the surface in the 3D space that map points lying on the surface with corresponding two-dimensional surface coordinates into three-dimensional coordinates in the 3D space).

Figure 5A:
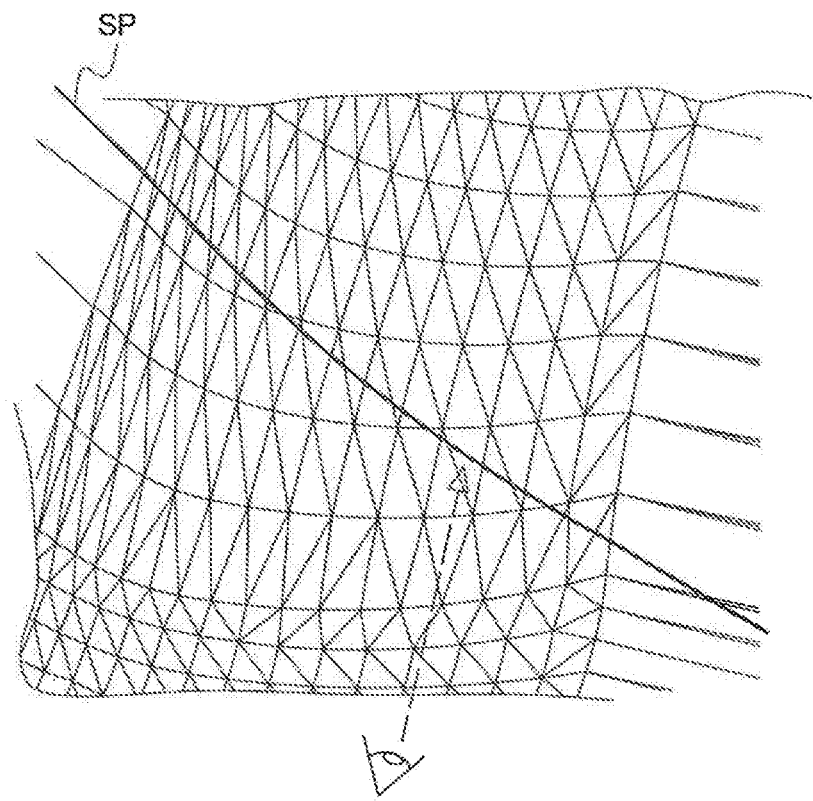
FIG. 5A illustrates, by way of example, a track line mapped from the 2D space of the image data onto the surface in accordance with 3D polygon model data of a three-dimensional workpiece.
Figure 5B:
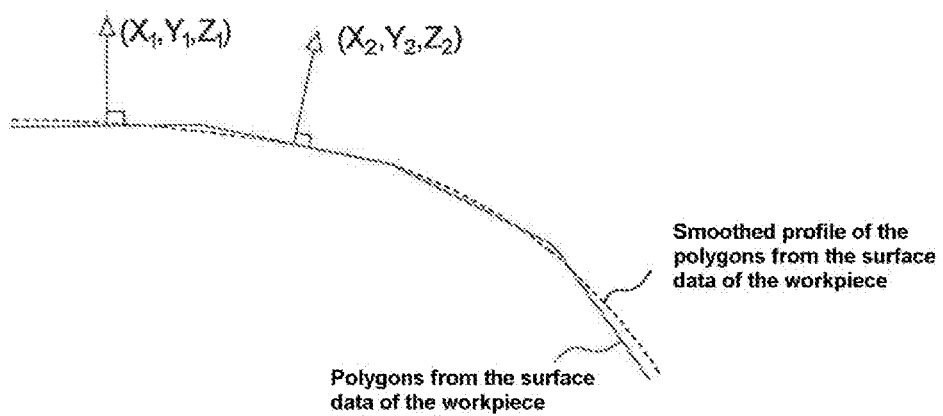
FIG. 5B illustrates, by way of example, a profile of the projected track line in cross section with respect to the surface, as arises through projection onto the surface in accordance with polygon model data.

Such a projection of a track line SP is illustrated, by way of example, in connection with FIGS. 5A and 5B. By way of example, the three-dimensional geometry specified in the model data has a multiplicity of polygonal surfaces (triangles and/or n-sided polygons, where n>3), and in particular a projection, performed in the generation of track segment data, of a straight track line onto the three-dimensional geometry specified in the model data, due to one or more transitions between adjacent polygonal surfaces that are inclined to one another, leads to mapping of the straight track line onto a track line having corners (see for example FIG. 5B).

Figure 8:
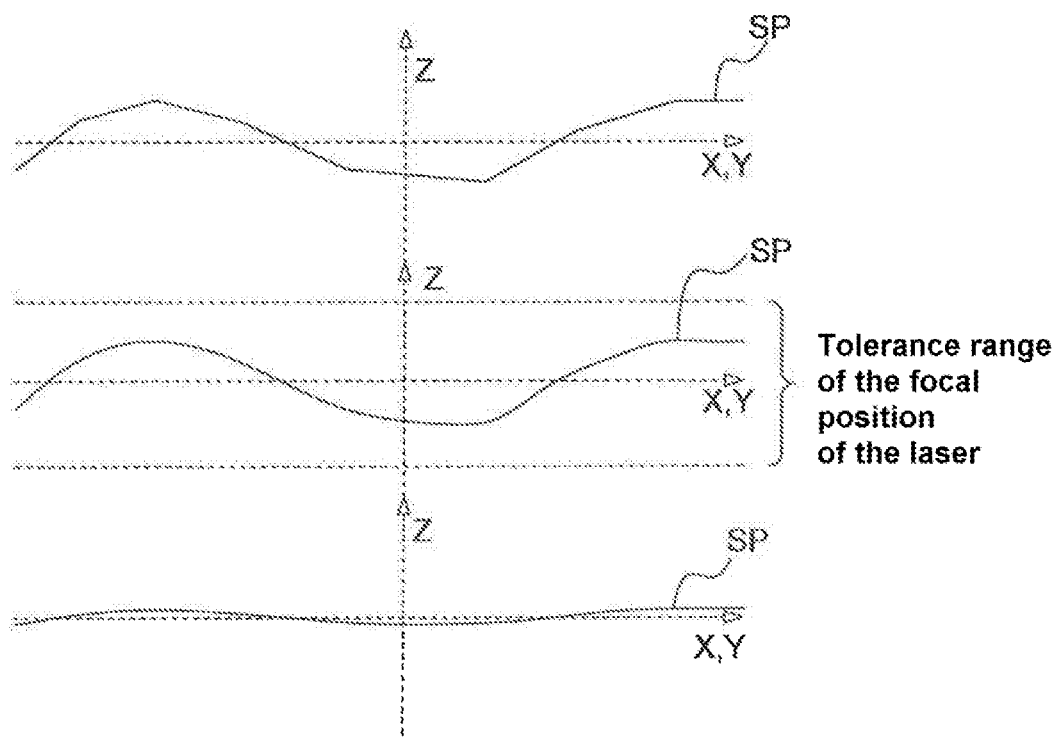
FIG. 8 shows profiles of a projected track line after projection, after smoothing of the corners and after smoothing of the curve of the track line in the direction of the laser direction of incidence Z.

In step S14, (optional) numerical smoothing of the profiles of the projected track lines or a plurality of track line sections having track line segments or track line segments in the 3D coordinate space of the model data is preferably performed (see for example exemplary configurations according to FIG. 5 and/or FIG. 8).

In this case, numerical smoothing is preferably performed for a track line (or sections or segments of the track line) determined in the generation of track segment data by way of projecting a straight track line onto the three-dimensional geometry specified in the model data, and coordinates of laser track segments 12 lying on the corresponding track line are then preferably determined on the basis of the numerically smoothed track line.

In this case, a smoothing procedure is preferably performed in the three-dimensional space in which corners of the corresponding track line are smoothed such that the smoothed track line has rounded profiles at positions of the corners that were previously present (see for example the dashed curve in FIG. 5B or the middle curve in FIG. 8).

In this case, additionally or alternatively, a smoothing procedure in the laser direction of incidence is preferably performed in the three-dimensional space, in which smoothing procedure the projected track line or the track line smoothed by way of the (above first) smoothing procedure is smoothed in the direction of the direction aligned parallel to the laser direction of incidence such that the further or more greatly smoothed track line runs flatter relative to the unsmoothed track line on a plane aligned perpendicular to the laser direction of incidence (see for example the bottom curve in FIG. 8).

The method furthermore comprises, by way of example, a step S15 of determining laser track segment coordinates on the basis of the projected and smoothed track line segments. This substantially corresponds to the projected coordinates from the regions, determined in step S12 and overlapping the texture pattern, of the track lines after projection (and optionally after sub-pixel interpolation and/or smoothing) into the 3D space. In this case, the coordinates of laser track segments 12 over which the laser has to travel in the switched-on state may be determined.

The exemplary method optionally comprises yet another further step S16 of modifying the determined coordinates of the determined laser track segments. On the one hand, numerical methods, such as for example sub-pixel interpolation and/or the smoothing methods, may already be used to achieve an increase in the collinearity of the laser track segments or an increase in the number of the substantially collinear laser track segments, but the collinearity of the laser track segments or the number of the substantially collinear laser track segments may be increased even further or maximized by modifying the determined coordinates of the laser track segments in the 3D coordinate space once again in such a way as to increase their collinearity or the number of the substantially collinear laser track segments (see for example FIG. 7).

In this case, the collinearity of adjacent laser track segments of the corresponding track line is preferably increased by modifying the three-dimensional coordinates of the laser track segments in a substantially radial direction relative to the direction of the laser track segments or of the respective track line. "Radial direction" is understood in this case to mean a direction that extends, at the respective coordinate point, substantially radially (that is to say substantially perpendicularly) away from or toward the track line, the corresponding laser track segment or an interpolating straight line running through the laser track segments. In the simplest case, this may be performed on the basis of a projection onto a substantially straight line (for example an interpolating straight line running through several or all of the laser track segments of a track line).

The modification of the three-dimensional coordinates of the laser track segments in a substantially radial direction is preferably performed by shifting coordinates of one or more points of the laser track segments in a substantially radial direction relative to the direction of the laser track segments or the respective track line, wherein, in the step of modifying the coordinates in order to increase the collinearity of adjacent laser track segments of a track line for three-dimensional coordinates of the laser track segments, a substantially radial coordinate shift is performed up to a maximum coordinate shift limit value.

The coordinate shift limit value for a coordinate shift in the direction of the first coordinate axis Z is preferably greater than the coordinate shift limit value for a coordinate shift in a direction lying in the plane of the other two coordinate axes X and Y, in particular since in this case a tolerance range of the focal position of the laser is able to be utilized (see also the explanations regarding FIG. 8).

A distance between adjacent track lines is preferably substantially less than or equal to a width (diameter) of the laser on the workpiece surface during machining thereof, and in particular less than or equal to half the width of the laser on the workpiece surface during machining thereof (up to less than or equal to 30% of the laser diameter, for example substantially 20% of the laser diameter, and preferably greater than or equal to 10% of the laser diameter), wherein the coordinate shift limit value, in particular for a coordinate shift in a direction lying in the plane of the other two coordinate axes (X, Y), is less than or equal to 5% of the width of the laser on the workpiece surface during machining thereof, in particular is less than or equal to 1% of the width of the laser on the workpiece surface during machining thereof.

The coordinate shift limit value for a coordinate shift in the direction of the first coordinate axis (Z) is preferably greater than or equal to 10%, in particular is greater than or equal to 35%, of the width of the laser on the workpiece surface during machining thereof; and/or the coordinate shift limit value for a coordinate shift in the direction of the first coordinate axis (Z) is greater than or equal to 50% of the tolerance width of the focal position of the laser, in particular greater than or equal to 75% of the tolerance width of the focal position of the laser. Wherein the tolerance width of the focal position of the laser is less than or equal to 1 mm, in particular less than or equal to 500 µm or less than or equal to 100 µm.

In this case, the modification of the three-dimensional coordinates of the laser track segments may be performed in a substantially radial direction in a plane lying substantially perpendicular to the laser direction of incidence and/or be performed substantially parallel to the laser direction of incidence.

In step S17, the determined (and possibly modified) coordinates of the determined laser track segments for the corresponding section are stored in a corresponding track segment dataset in the generation of the track segment data, which is then used as a basis to generate the control data (with generation of the segment sequences on the basis of the laser track segments) (see for example step S4 above).

In addition, in the above examples, in numerical calculations of the method, in the generation of the track segment data, the coordinates of the image and/or model data, in particular including the two-dimensional and/or three-dimensional coordinates on which the coordinate mapping is based, may be read with a spatial resolution that corresponds to at least a resolution accuracy of $1/1000$ of the width of the laser on the workpiece surface, of the distance between adjacent track lines, of a polygon size of the model data, or of a pixel width of the image data, in particular preferably an accuracy of at least $1/10000$; and/or in numerical calculations of the method, in the generation of the track segment data, the coordinates of the image and/or model data, in particular including the two-dimensional and/or three-dimensional coordinates on which the coordinate mapping is based, may be read with a spatial resolution that has at least a resolution accuracy of 10 nm, in particular substantially a resolution accuracy of 1 nm or of less than 1 nm.

In the above exemplary embodiments, it has for example been assumed that the parallel-running straight-line track lines have been arranged in the 2D coordinate space of the image data of the pixel image of the texture pattern and are projected onto the surface form of the 3D model data as early as or alongside the determination of the overlaps with the texture pattern from the 2D coordinate space of the image data, or track line segments corresponding to the texture pattern and already determined in the 2D space of the image data are projected.

It is also possible to arrange the parallel-running straight-line track lines in the 3D coordinate space of the image data in the predetermined plane, which may be for example that plane that is able to be aligned substantially perpendicular to the laser direction of incidence (for example the X-Y plane in FIG. 8). All of the track lines may then be projected onto the surface form of the 3D model data in one direction (for example perpendicular to the plane). Furthermore, two-dimensional surface coordinates (for example UV coordinates) may then be read for each projected track line on the surface form of the 3D model data, for which surface coordinates pixel values or interpolated pixel values may then be read from the image data or the pixel image. On the basis of the read pixel values or interpolated pixel values, the corresponding laser track segments or laser track segment coordinates may then be read on the projected track line.

Figure 3:
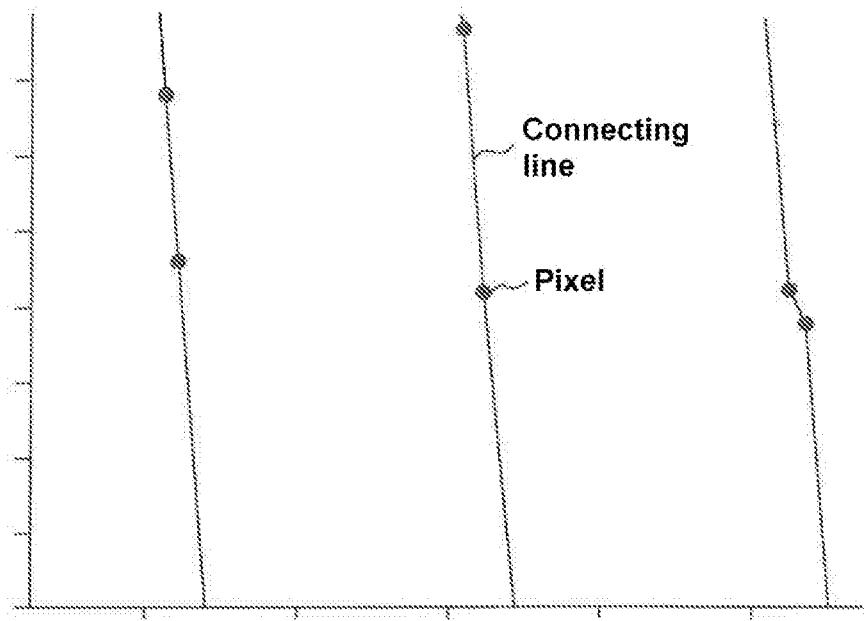
FIG. 3 shows, by way of example, the profile of connecting lines between individual pixels on the basis of image data of a pixel image.

FIG. 3 shows, by way of example, the profile of connecting lines between individual pixels on the basis of image data of a pixel image without sub-pixel interpolation and without smoothing. By way of example, this shows three connecting lines, running substantially parallel to one another, between pixels, along which the laser is intended to travel in the switched-on state. However, it is able to be seen in the right-hand connecting line that there is a change in the line profile at the end.

The reason for such line profiles may be a comparatively very short section of the connecting line that results from a slight lateral deviation of a pixel with respect to the corresponding connecting line from previous collinear pixels.

This lateral offset on its own constitutes a negligibly small problem, for example for the quality of the machining. However, the offset in the subsequent generation of machining sequences 10 may lead to a situation whereby the output software, when generating the control data, classifies the change of direction of the connecting line too greatly, and thus interrupts the process of generating a machining sequence 10 containing a plurality of machining segments 12 at this point, in order then to start generating a further machining sequence 10.

The result of this is that an unnecessarily high number of additional machining sequences 10 is generated, which leads to a likewise unnecessary increase in the machining time of the workpiece surface.

Figure 4:
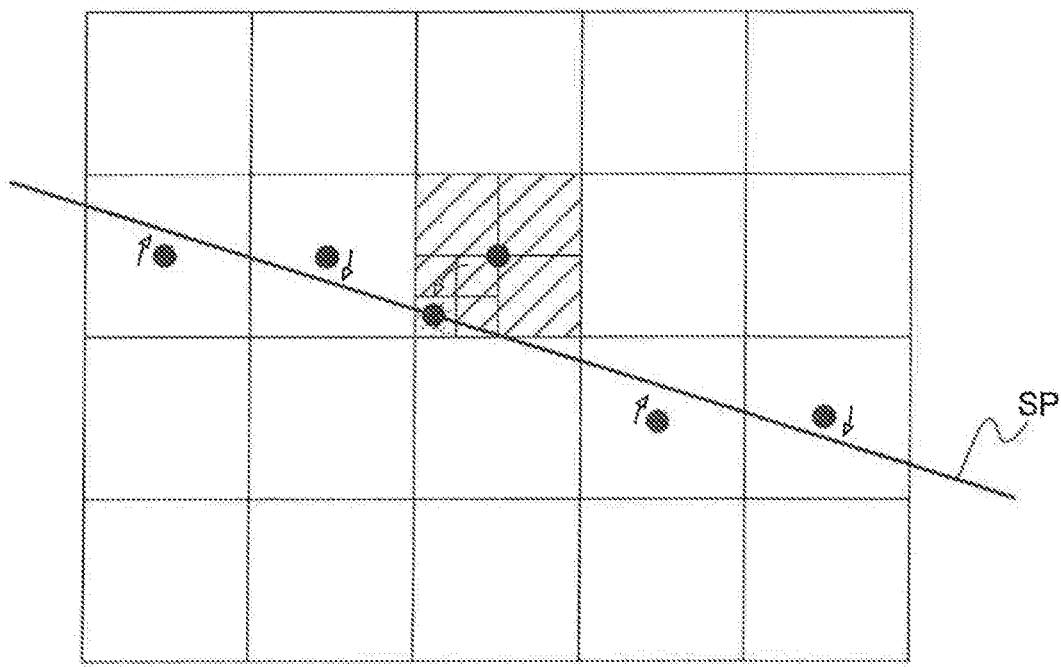
FIG. 4 illustrates, by way of example, a sub-pixel interpolation in order to determine the positioning of the laser track segments on the basis of the image data of a pixel image.

It is therefore advantageous, as shown in FIG. 4, if the image data or raster graphics of the texture to be applied are already prepared for example by way of an interpolation method (for example sub-pixel interpolation).

FIG. 4 illustrates, by way of example, a sub-pixel interpolation in order to determine the positioning of the laser track segments on the basis of the image data of a pixel image.

In a first step, track lines SP or hatch lines are laid over the raster graphics or the pixel image, on the basis of the profile of which the laser is intended to obtain the information from the raster graphics. As a result, the laser track segments to be arranged on the respective track lines are able to be determined, in particular by determining the regions of overlap of the respective track line with the texture of the image data or with particular pixel value ranges of the texture of the image data, if depth information is also intended to be taken into account.

The track line SP (as in this example) runs for example transversely over a plurality of pixels of the raster graphics, which may additionally contain depth information for the subsequent lasering (see hatched pixels) depending on its grayscale (or depending on the pixel value).

By virtue of the resolution (pixel width) of the raster graphics (pixel image), when determining coordinates of the regions of overlap of the track line with the texture specified in the image data, pixel errors may occur in which errors in the order of magnitude of the pixel width may occur. Although this barely has any influence on the image quality, since such errors of this order of magnitude are negligible here, this may however lead to the determination of very short laser track segments that, although they do not exceed a length of the size of the pixel width, may cause relatively large angle errors which may lead to a situation whereby a later segment sequence has to be ended at this point and a new segment sequence has to be begun.

A resolution of the image data could then in principle be specified more accurately, but this leads to undesirably large amounts of data which may reach several gigabytes in the case of large surfaces, without this being necessary for image quality reasons. Rather than this, a sub-pixel interpolation, in particular in the lateral direction transverse or perpendicular to the respective track line, may preferably be performed.

The color filling (illustrated as hatching in FIG. 4B) of the pixel indicates that the pixel specifies a defined depth value. It is then attempted to use interpolation to place the interpolated pixel value as centrally as possible on the track line SP or hatched line. It may be the case here that the depth value of the pixel changes due to the interpolation method (see smaller, dotted pixel). In this case, the track line SP or hatched line has covered only a very small part of the whole pixel, such that, due to the adjacent partly white pixel (without filling), the grayscale has changed to a lighter color tone and, even due to this, the depth value is then also somewhat different.

Due to the fact that, in addition to the depth value, the two-dimensional position of the pixel value has also changed, this is not a problem for the later lasering of the workpiece surface. The whole pixels generally in these cases have a considerably smaller surface area than the laser beam. In addition, due to its beam caustics and the Rayleigh length, the laser beam has a certain tolerance of its focal point in the depth direction, such that slight changes in the depth values of the pixels and a shift in the position of the pixel value have a negligibly small influence on the result of the laser texturing.

Interpolation methods for example in the lateral direction of the track line SP or hatched line may be suitable for such preparation of the image data, but interpolation methods with an action limited locally to a particular section of the track line may also however be suitable. Within an interpolation method, the pixels under consideration (and higher resolutions thereof) may also be provided with a weighting, such that for example the pixel that lies closer to the track line receives a higher weighting than one of the other pixels under consideration. Any interpolation method may also be applied multiple times consecutively or alternately with other interpolation methods.

If the image data of the raster graphics are then prepared through sub-pixel interpolation, the lines of the hatching (here in the example of a line) may be laid over the surface of the 3D model, as shown in the top illustration in FIG. 5.

FIG. 5A illustrates, by way of example, a track line SP mapped from the 2D space of the image data onto the surface in accordance with 3D polygon model data of a three-dimensional workpiece.

By describing the surface, in particular at points with freeform surfaces, by way of n-sided polygons, triangles or quadrilaterals are generated over which the track line is laid. As a result, the straight line in the 2D depiction receives an "angular" profile in the application in the 3D space.

To be able to imagine this scenario somewhat better, an "eye" with a viewing direction onto the track line is additionally shown in the illustration of FIG. 5A. From this viewing angle, it is possible to perceive the "angular" profile, as shown by way of example in the bottom illustration of FIG. 5B.

The changes of direction that occur here from polygon to polygon may in this case be so great in part, in particular in the case of very large polygons, due to a correspondingly low resolution, that an interruption of the process for generating the machining sequences 10 is highly likely.

In order to be able to avoid this, the spatial resolution of the polygons may be increased in a first step. To this end, the position of the polygons may be specified considerably more accurately by way of floating point numbers than with integer (x,y,z) values. It is the case here that, the more places after the point, the more accurate the position specification for each polygon. This leads to more accurate coordinates in which rounding errors are able to be avoided, such that angle deviations generated due to rounding errors are avoided. This leads to a more precise profile of the workpiece surface, such that the polygonal transition corners occur.

To round the profile of the track line projected onto the workpiece surface in accordance with the geometric form of the model data such that the "angular" profile of the track line is generally able to be reduced from polygon to polygon in relation to rounder transitions, further smoothing of the profile of the track line is preferably performed. The accuracy is thus initially increased in order to avoid rounding errors, but then reduced again by smoothing the angular profiles that are present, provided that the track line does not have any more angular edges, such that angle deviations at and between laser track segments are able to be avoided on the smoothed track line and the collinearity of the laser track segments is able to be increased.

An interpolation method and/or a numerical smoothing method may again be applied in order to smooth any "angular" profile of the track line that is present. This is intended to be clarified in the bottom illustration in FIG. 5B with reference to the rounded dashed line.

By preparing the image data in the 2D plane by way of sub-pixel interpolation and optimizing the track line profile on the surface of the workpiece by numerical smoothing, it is at this point already possible to achieve a considerable improvement to the data for the later generation of the machining sequences. This is illustrated in FIGS. 6A and 6B with reference to the direction vectors of the machining segments that are generated in a later step along the track lines.

Figure 6A:
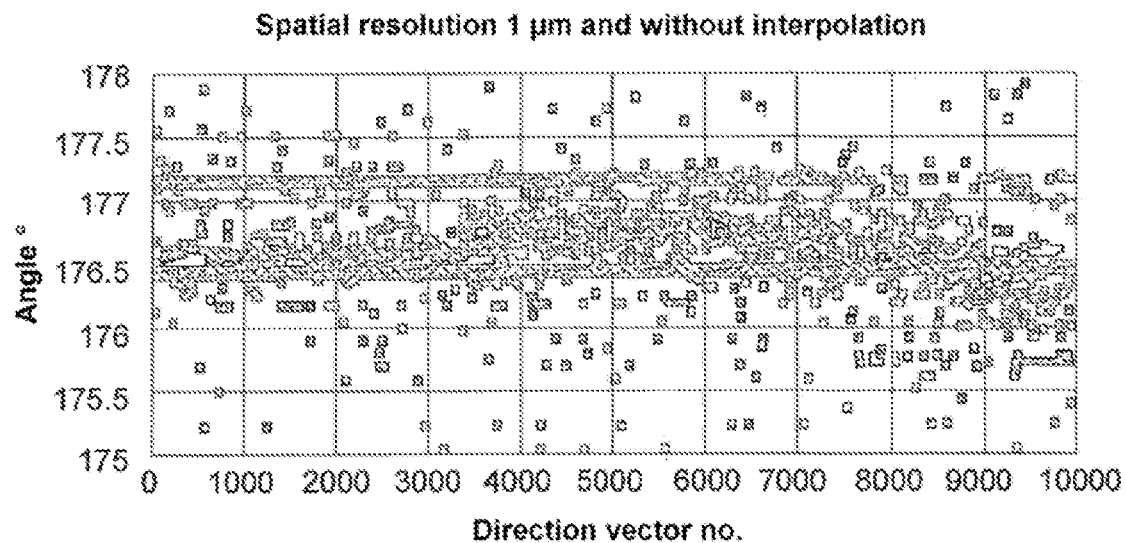
FIG. 6A shows, by way of example, angle directions of direction vectors of laser track segments with a low spatial resolution and without interpolation.
Figure 6B:
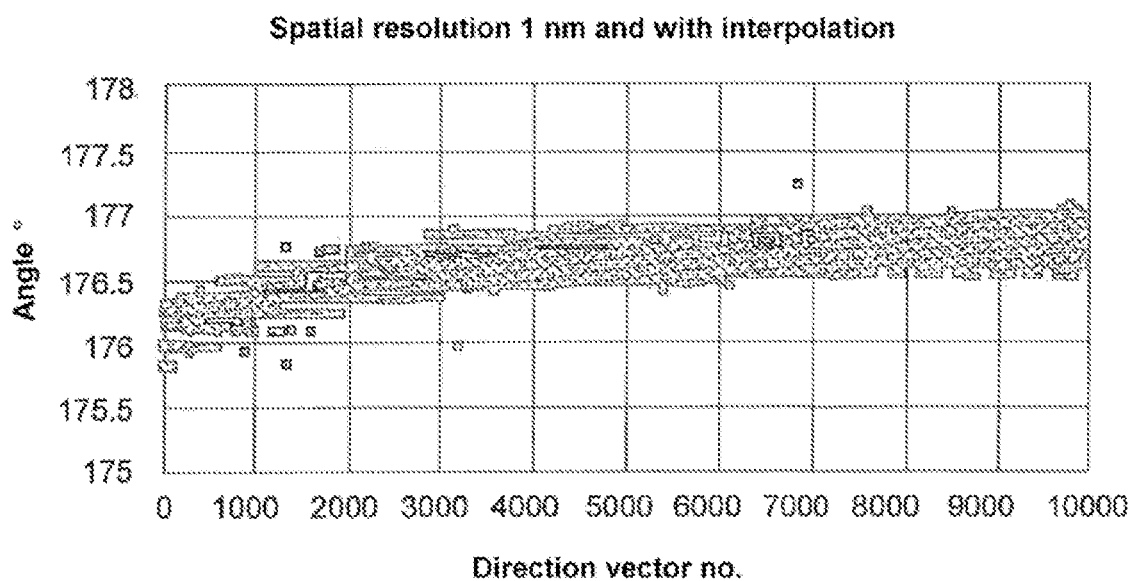
FIG. 6B shows, by way of example, angle directions of direction vectors of laser track segments with a high spatial resolution and with interpolation.

FIG. 6A shows, by way of example, angle directions of direction vectors of laser track segments with a low spatial resolution of the coordinates and without interpolation, and FIG. 6B shows, by way of example, angle directions of direction vectors of laser track segments with a high spatial resolution of the coordinates and with interpolation.

The illustration of FIG. 6A shows how, in the case of a comparatively coarse spatial resolution (1 μm) of the coordinates and without interpolation, the direction vectors of the individual machining segments may scatter. Although a concentration of the direction vectors, as shown in this example, is able to be seen in the range of 176.5° and 177.2°, a very large number of direction vectors scatters in the range from 175° to around 178°.

This leads to a situation whereby software attempting to detect continuous machining segments 12 and incorporate these into a machining sequence 10 interrupts very early and very frequently in order to generate a new machining sequence 10 again. As a result, a very large number of small machining sequences 10 containing correspondingly frequent start and end segments 11, 13 are obtained. This is not sufficient for effective machining of a workpiece surface.

By contrast, it is able to be seen in the illustration of FIG. 6B how the direction vectors only vary in the range from 176.5° to 177°, and so the scattering of the direction vectors has been able to be considerably reduced. This was achieved (as applied in this example) by a spatial resolution of 1 nm and an interpolation method.

The software, which still attempts to detect continuous (substantially collinear) machining segments 12 (laser track segments) and incorporate these into a machining sequence 10 (segment sequence), then interrupts later and therefore generates fewer machining sequences 10 containing an on average higher number of machining segments 12. As a result, the number of the start and end segments 11, 13 (starting and end traveled-over segments) is also reduced, and the machining time of the workpiece surface is considerably reduced overall.

After the laser track segments have been determined by projecting the regions, overlapping the texture pattern of the image data, of the track lines onto the surface geometry, specified by the model data, of the section of the workpiece, possibly including performing sub-pixel interpolation of the pixel values of the pixel image and/or smoothing of the projected track line profile, the coordinates of the laser track segments may be output as track segment data.

Furthermore, at this point as well, the collinearity of the track segments or the number of the collinear track segments may be increased by analyzing and modifying the already determined coordinates. It is possible to laterally shift the pixels (in particular starting and end points) of the laser track segments while complying with certain limit values, without negatively influencing the image quality.

Figure 7:
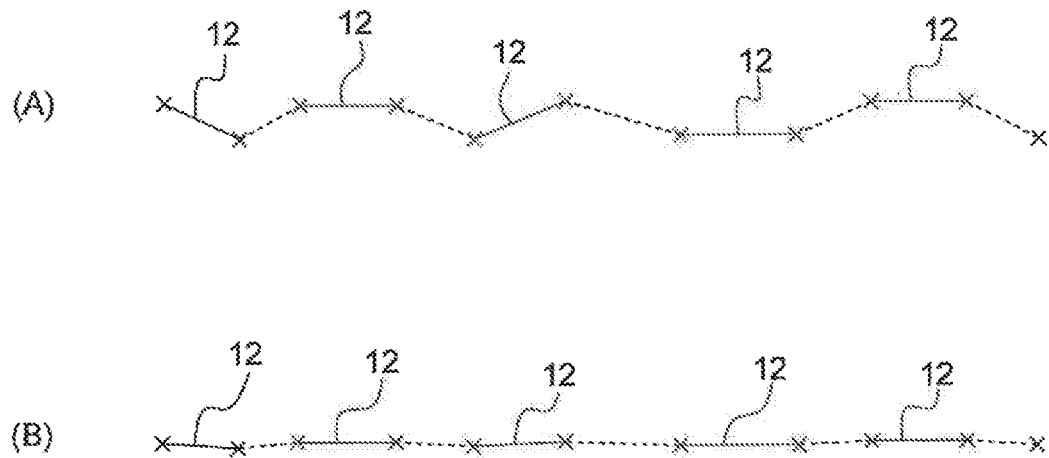
FIG. 7 illustrates, by way of example, a coordinate modification of coordinates of laser track segments in order to increase the collinearity of the laser track segments of the track segment data.

FIG. 7 illustrates, by way of example, a coordinate modification of coordinates of laser track segments in order to increase the collinearity of the laser track segments of the track segment data.

The exemplary sequence a) of laser track segments 12 in FIG. 7 has excessive angle deviations, by way of example. The coordinates of the laser track segments 12 (in particular the starting and end points) may be modified in the radial direction (that is to say transverse or perpendicular to the respective laser track segment or a curve interpolated through the laser track segments or the track line) in order to increase the collinearity of the laser track segments, as shown by way of example in sequence b) of laser track segments 12 in FIG. 7.

Further effects that may be used to generate machining sequences 10 that are as long as possible are the properties, already discussed above, of the laser beam in terms of the tolerances of its focal point position.

FIG. 8 shows profiles of a projected track line after projection, after smoothing of the corners and after smoothing of the curve of the track line in the direction of the laser direction of incidence Z. FIG. 8 illustrates a profile of a track line with respect to the laser direction of incidence (Z direction).

At the beginning, the profile of the track line SP is still somewhat "angular" (see top illustration), but this is able to be smoothed by interpolation or smoothing methods, such as already described further above (see middle illustration in this respect).

If the tolerance range of the focal point position of the laser is then considered with respect to the plane lying perpendicular to the laser incidence (here the x,y plane), it is thus able to be seen that there is still enough "room for maneuver" available for the profile of the track line SP, within which room for maneuver the track line SP is able to be shifted.

A great advantage in this case is that, due to the beam caustics and the Rayleigh length of the laser, the texturing process is able to tolerate significantly higher deviations in the longitudinal direction of the laser beam than is possible in the lateral direction to the laser beam. As a result, the profile of the track line SP is able to be intentionally distorted to a great extent in order later to obtain machining sequences 10 that are as long as possible, without in the process thereby negatively influencing the quality of the laser process too greatly.

This may again be brought about using already-mentioned interpolation methods or mathematical smoothing methods.

Figure 9:
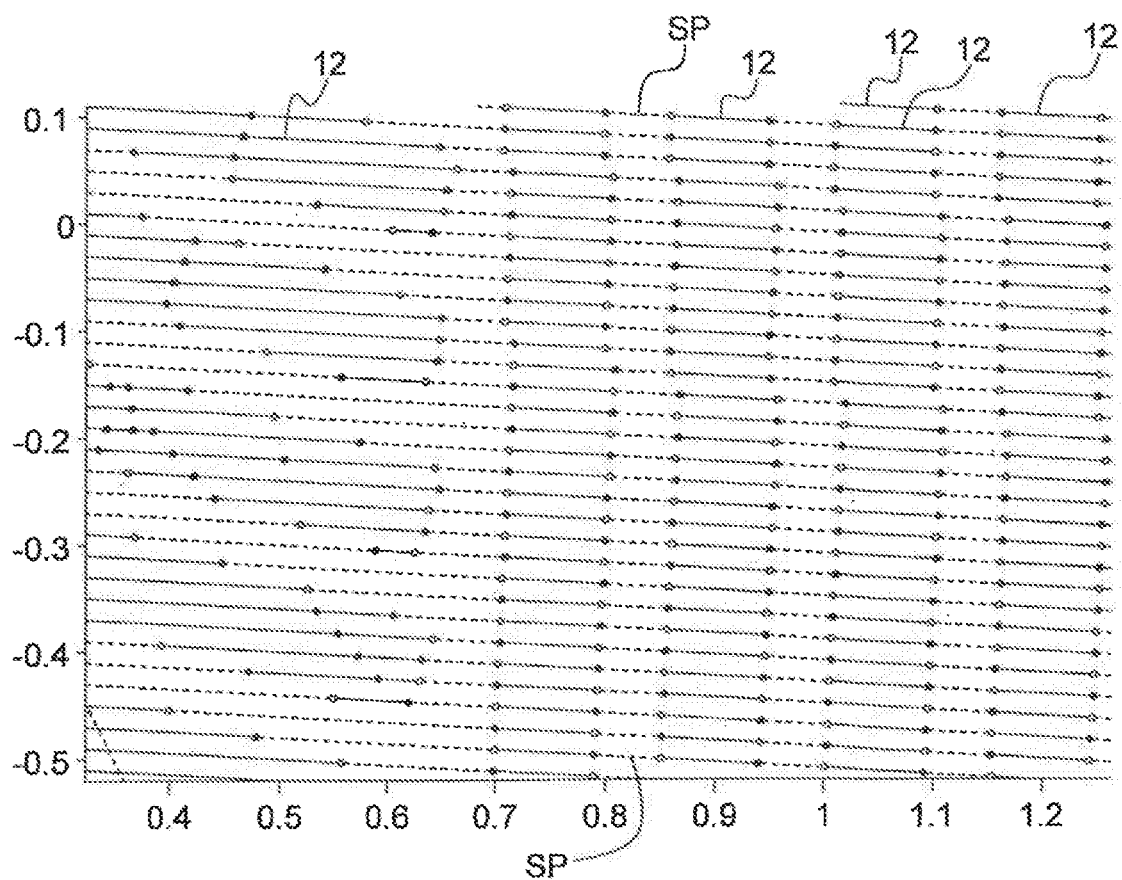
FIG. 9 shows, by way of example, a multiplicity of parallel-running track lines with respective laser track segments determined in accordance with the texture pattern of the image data.

FIG. 9 shows, by way of example for a multiplicity of parallel-running track lines SP that have laser track segments 12 determined in accordance with the texture pattern of the image data. It is shown by way of example that these laser track segments 12 of the respective track lines are arranged so as to be collinear to one another, such that the respective laser track segments of a track line are able to be traveled over in a single segment sequence. The machining time is thus able to be considerably reduced without a loss in the quality of the depiction of the texture pattern. The distance between the parallel-running track lines is roughly 75 to 95% of the width of the laser on the surface, for example roughly 25 to 50 μm.

Examples or exemplary embodiments of the present invention and the advantages thereof have been described in detail above with reference to the appended figures.

It is emphasized once again that the present invention is however in no way limited or restricted to the exemplary embodiments described above and the embodiment features thereof, but rather also comprises modifications of the exemplary embodiments, in particular those that are comprised by modifying the features of the described examples or by combining individual features or a plurality of the features of the described examples within the context of the scope of protection of the independent claims.

The invention claimed is:

1. A method for machining at least one workpiece surface in order to apply a texture pattern to at least one section of the workpiece surface by way of a laser comprising:
   providing image data that specify an image of the texture pattern to be applied to the at least one section of the workpiece surface, and model data that specify a three-dimensional geometry of a surface form corresponding to the at least one section of the workpiece surface;
   generating track segment data on the basis of the image data and of the model data, wherein the track segment data each specify a multiplicity of consecutive laser track segments along the respective track line for a multiplicity of track lines running on the section of the workpiece surface, depending on the texture pattern;
   generating control data on the basis of the generated track segment data, wherein the control data specify one or more segment sequences for each track line, and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed; and
   outputting the generated control data to a laser device that controls the laser on the basis of the control data in order to apply the texture pattern to the at least one section of the workpiece surface;
   wherein the track segment data are created on the basis of the image data and model data, provided that, for each track line, the number of adjacent laser track segments that are arranged so as to be substantially collinear relative to one another is increased and
   wherein the control data are generated such that each segment sequence, having at least two laser track segments, between two adjacent laser track segments that are aligned substantially collinear to one another, each has a traveled-over segment over which the laser travels in the switched-off state at the substantially constant machining setpoint speed.

2. The method as claimed in claim 1, wherein
   the step of generating track segment data furthermore comprises, for each track line: increasing the collinearity of adjacent laser track segments of the corresponding track line by modifying the three-dimensional coordinates of the laser track segments in a substantially radial direction relative to the direction of the laser track segments or of the respective track line.

3. The method as claimed in claim 2, wherein
   the modification of the three-dimensional coordinates of the laser track segments in a substantially radial direction is performed by way of shifting coordinates of one or more points of the laser track segments in a substantially radial direction relative to the direction of the laser track segments or of the respective track line.

4. The method as claimed in claim 3, wherein
   in the step of increasing the collinearity of adjacent laser track segments of a track line for three-dimensional coordinates of the laser track segments, a substantially radial coordinate shift is performed up to a maximum coordinate shift limit value.

5. The method as claimed in claim 4, wherein
   a first coordinate axis in the three-dimensional coordinate system of the model data is aligned substantially parallel to the laser direction of incidence during the machining, and a plane of the other two coordinate axes in the three-dimensional coordinate system of the model data is aligned substantially perpendicular to the laser direction of incidence during the machining,
   wherein the coordinate shift limit value for a coordinate shift in the direction of the first coordinate axis is greater than the coordinate shift limit value for a coordinate shift in a direction lying in the plane of the other two coordinate axes.

6. The method as claimed in claim 4, wherein
   a distance between adjacent track lines is substantially less than or equal to a width of the laser on the workpiece surface during machining thereof,
   wherein the coordinate shift limit value is less than or equal to 5% of the width of the laser on the workpiece surface during machining thereof.

7. The method as claimed in claim 5, wherein
   the coordinate shift limit value for a coordinate shift in the direction of the first coordinate axis is greater than or equal to 10% of the width of the laser on the workpiece surface during machining thereof; and/or the coordinate shift limit value for a coordinate shift in the direction of the first coordinate axis is greater than or equal to 50% of the tolerance width of the focal position of the laser.

8. The method as claimed in claim 2, wherein
   the modification of the three-dimensional coordinates of the laser track segments is performed in a substantially radial direction in a plane lying substantially perpendicular to the laser direction of incidence or the modification of the three-dimensional coordinates of the laser track segments is performed in a substantially radial direction substantially parallel to the laser direction of incidence.

9. The method as claimed in claim 1, wherein
   the model data furthermore specify a coordinate mapping of two-dimensional coordinates of a first coordinate system of the image data onto three-dimensional coordinates of a second coordinate system on the surface form of the model data or onto two-dimensional coordinates of a third coordinate system of surface coordinates running on the surface form,
   wherein the generation of track segment data on the basis of the image data and of the model data comprises:
     hatching a section, corresponding to the at least one section of the workpiece surface, with a multiplicity of parallel-running track lines,
     projecting the track lines or segments of the track lines onto the three-dimensional geometry of the surface form corresponding to the at least one section of the workpiece surface, and/or
     determining track line segments at which the track lines overlap the texture pattern in the corresponding section of the image of the texture pattern.

10. The method as claimed in claim 9, wherein
    the multiplicity of parallel-running track lines are arranged in the first coordinate system of the image data and the step of determining track line segments at which the track lines overlap the texture pattern in the corresponding section of the image of the texture pattern is performed in the first coordinate system of the image data.

11. The method as claimed in claim 10, wherein
in the step of projecting the track lines or segments of the track lines, the determined track line segments are projected onto the three-dimensional geometry of the surface form corresponding to the at least one section of the workpiece surface by mapping two-dimensional coordinates of each determined track line segment from the first coordinate system of the image data onto three-dimensional coordinates on the surface form of the model data on the basis of the coordinate mapping of the model data, such that the three-dimensional coordinates, for each track line segment in the first coordinate system, of a corresponding laser track segment are determined in the second coordinate system.

12. The method as claimed in claim 9, wherein
the multiplicity of parallel-running track lines in the second coordinate system of the model data are arranged in a track line plane that is aligned substantially perpendicular to the laser direction of incidence, and
in the step of projecting the track lines or segments of the track lines, the track lines in the second coordinate system of the model data are projected from the track line plane onto the three-dimensional geometry of the surface form corresponding to the at least one section of the workpiece surface.

13. The method as claimed in claim 12, wherein
in the step of determining track line segments at which the track lines overlap the texture pattern in the corresponding section of the image of the texture pattern, there are determined, by way of the coordinate mapping for coordinates of the projected track line, image values of the image data, specifying the texture pattern, at corresponding coordinates in the coordinate space of the image data, and the track line segments are determined on the basis of the determined image values in the coordinate space of the model data.

14. The method as claimed in claim 9, wherein
the image data specify a pixel image of the texture pattern with a pixel width that is greater than or equal to 10% of the width of the laser on the workpiece surface during machining thereof.

15. The method as claimed in claim 14, wherein
a sub-pixel interpolation is performed during the determination of track line segments at which the track lines overlap the texture pattern in the corresponding section of the pixel image of the texture pattern, or during the determination of image values or pixel values.

16. The method as claimed in claim 15, wherein
a coordinate interpolation in a lateral direction is performed in the sub-pixel interpolation, the lateral direction being transverse or perpendicular relative to the direction of the corresponding track line.

17. The method as claimed in claim 1, wherein
the three-dimensional geometry specified in the model data has a multiplicity of polygonal surfaces performed in the generation of track segment data, of a straight track line onto the three-dimensional geometry specified in the model data, due to one or more transitions between adjacent polygonal surfaces that are inclined to one another, leads to mapping of the straight track line onto a track line having corners.

18. The method as claimed in claim 17, wherein
numerical smoothing is performed for a track line determined in the generation of track segment data by way of projecting a straight track line onto the three-dimensional geometry specified in the model data, and coordinates of laser track segments lying on the corresponding track line are determined on the basis of the numerically smoothed track line.

19. The method as claimed in claim 18, wherein
the numerical smoothing has a first smoothing procedure, performed in the three-dimensional space, in which corners of the corresponding track line are smoothed, such that the smoothed track line has rounded profiles at positions of the corners that were previously present.

20. The method as claimed in claim 19, wherein
the numerical smoothing has a second smoothing procedure, performed in the laser direction of incidence, in which the track line smoothed by way of the first smoothing procedure is smoothed in the direction of the direction aligned parallel to the laser direction of incidence, such that the further-smoothed track line runs flatter relative to the unsmoothed track line on a plane aligned perpendicular to the laser direction of incidence.

21. The method as claimed in claim 1, wherein
the image data specify a pixel image of the texture pattern, each pixel of the pixel image being assigned a pixel value that specifies a predetermined depth of the texture pattern to be applied to the tool surface at the corresponding position of the texture pattern,
wherein individual track segment data are generated for different depth levels of the texture pattern on the basis of the pixel values of the pixel image, such that the texture pattern is carved out to different depth levels in consecutive machining procedures on the basis of the control data generated on the basis of the respective track segment data.

22. The method as claimed in claim 1, wherein
in numerical calculations of the method, in the generation of the track segment data, the coordinates of the image and/or model data are read with a spatial resolution that corresponds to at least a resolution accuracy of $1/1000$ of the width of the laser on the workpiece surface, of the distance between adjacent track lines, of a polygon size of the model data, or of a pixel width of the image data; and/or
in numerical calculations of the method, in the generation of the track segment data, the coordinates of the image and/or model data are read with a spatial resolution that has at least a resolution accuracy of 10 nm.

23. The method as claimed in claim 1, wherein
each segment sequence comprises a starting traveled-over segment over which the laser travels in the switched-off state so as to accelerate to the machining setpoint speed, and an end traveled-over segment over which the laser travels in the switched-off state so as to brake from the machining setpoint speed.

24. A method for generating track segment data for use in the generation of control data for a method for machining at least one workpiece surface in order to apply a texture pattern to at least one section of the workpiece surface by way of a laser as claimed in claim 1,
wherein the control data specify one or more segment sequences for each track line, and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed, comprising:

providing image data that specify an image of the texture pattern to be applied to the at least one section of the workpiece surface, and model data that specify a three-dimensional geometry of a surface form corresponding to the at least one section of the workpiece surface; and generating track segment data on the basis of the image data and of the model data, wherein the track segment data each specify a multiplicity of consecutive laser track segments along the respective track line for a multiplicity of track lines running on the section of the workpiece surface, depending on the texture pattern;

wherein the track segment data are created on the basis of the image data and model data, provided that, for each track line, the number of adjacent laser track segments that are arranged so as to be substantially collinear relative to one another is increased such that, in the generation of the control data, the number of the adjacent laser track segments of a track line that are aligned substantially collinear to one another and are able to be integrated into a common segment sequence is increased.

25. A control device for use on a numerically controlled machine tool that comprises a laser device for machining at least one workpiece surface in order to apply a texture pattern to at least one section of the workpiece surface by way of a laser of the laser device, wherein the control device is configured so as to perform a method as claimed in claim 1 on the machine tool;

control the machine tool on the basis of the control data generated in a method in which control data specify one or more segment sequences for each track line, and each segment sequence has track segments along which the laser is guided in order to apply the texture pattern to the at least one section of the workpiece surface, and wherein the track segments of a segment sequence comprise one or more laser track segments over which the laser travels in the switched-on state at a substantially constant machining setpoint speed;

on the basis of provided model data that specify a three-dimensional geometry of a surface form corresponding to the at least one section of the workpiece surface, and provided image data that specify an image of the texture pattern to be applied to the at least one section of the workpiece surface, so as to generate laser track segment data, wherein the track segment data each specify a multiplicity of consecutive laser track segments along the respective track line for a multiplicity of track lines running on the section of the workpiece surface, depending on the texture pattern, wherein the track segment data are created on the basis of the image data and model data, provided that, for each track line, the number of adjacent laser track segments that are arranged so as to be substantially collinear relative to one another is increased; and/or so as to generate the control data on the basis of generated or provided laser track segment data;

wherein the control data are generated such that each segment sequence, having at least two laser track segments, between two adjacent laser track segments that are aligned substantially collinear to one another, each has a traveled-over segment over which the laser travels in the switched-off state at the substantially constant machining setpoint speed.

26. A machine tool having:

a control device as claimed in claim 25;

a laser device having a laser that is able to be guided over a workpiece surface in a controlled manner in three directions by the control device in order to apply a texture pattern to at least one section of the workpiece surface by way of the laser of the laser device.

27. The machine tool as claimed in claim 26, wherein the laser is able to be moved in a direction substantially perpendicular relative to the direction of the laser beam of the laser at machining speeds of greater than or equal to 2 m/s.

28. The machine tool as claimed in claim 26, wherein the laser device has a divergence-changing device in order to control the laser in a direction aligned substantially in the direction of the laser beam of the laser.

29. The machine tool as claimed in claim 28, wherein the laser is able to be moved in the direction of the laser beam of the laser at machining speeds of greater than or equal to 4 m/s.

30. The machine tool as claimed in claim 27, wherein the laser is able to be moved in the direction of the laser beam of the laser at a maximum machining speed that is substantially equal to or greater than a maximum machining speed of the laser in a direction substantially perpendicular relative to the direction of the laser beam of the laser.

31. The machine tool as claimed in claim 26, wherein the laser of the laser device is configured so as to be operated at a pulse frequency of greater than or equal to 200 kHz.

32. The method as claimed in claim 1, wherein the image of the texture pattern is two-dimensional.

* * * * *